(12) United States Patent
de Oliveira et al.

(10) Patent No.: US 9,063,280 B2
(45) Date of Patent: Jun. 23, 2015

(54) METHOD FOR PRODUCING COATINGS HAVING ANTI-REFLECTION PROPERTIES

(75) Inventors: Peter William de Oliveira, Saarbruecken (DE); Mohammad Jilavi, Kirkel (DE); Sakthivel Shanmugasundaram, Hyderabad (IN); Michael Veith, St.-Ingbert (DE)

(73) Assignee: Leibniz-Institut fuer Neue Materialien gemeinnuetzige GmbH, Saarbruecken (DE)

( * ) Notice: Subject to any disclaimer, the term of this patent is extended or adjusted under 35 U.S.C. 154(b) by 0 days.

(21) Appl. No.: 13/387,565

(22) PCT Filed: Jul. 6, 2010

(86) PCT No.: PCT/EP2010/004076
§ 371 (c)(1),
(2), (4) Date: Jan. 27, 2012

(87) PCT Pub. No.: WO2011/012214
PCT Pub. Date: Feb. 3, 2011

(65) Prior Publication Data
US 2012/0125234 A1  May 24, 2012
US 2013/0068137 A2  Mar. 21, 2013

(30) Foreign Application Priority Data
Jul. 31, 2009 (DE) .......... 10 2009 035 797

(51) Int. Cl.
*C09D 1/00* (2006.01)
*C04B 41/49* (2006.01)
*G02B 1/118* (2015.01)
*G02B 1/10* (2015.01)
*G02B 27/00* (2006.01)

(52) U.S. Cl.
CPC ............ *G02B 1/118* (2013.01); *G02B 1/105* (2013.01); *G02B 27/0006* (2013.01)

(58) Field of Classification Search
USPC ........ 106/287.17, 286.1, 286.4, 286.8, 287.1
See application file for complete search history.

(56) References Cited

U.S. PATENT DOCUMENTS

| 7,189,768 B2 | 3/2007 | Baran, Jr. et al. |
| 8,119,221 B2 | 2/2012 | Mennig et al. |
| 2004/0197550 A1 | 10/2004 | Ke et al. |

(Continued)

FOREIGN PATENT DOCUMENTS

| DE | 10323729 A1 | 12/2004 |
| DE | 112006002940 T5 | 12/2008 |

(Continued)

OTHER PUBLICATIONS

PCT Application No. PCT/EP2010/004076, Notification of Transmittal of Translation of the International Preliminary Report on Patentability (Chapter I or Chapter II), dated Feb. 16, 2012.

(Continued)

*Primary Examiner* — James McDonough
(74) *Attorney, Agent, or Firm* — Cahn & Samuels, LLP

(57) ABSTRACT

A method for producing coatings having anti-reflection properties uses a compound comprising at least one type of nanoparticle and at least one solvent. The compound is applied to a substrate and treated at various temperatures. Anti-reflection coatings can be obtained on temperature-sensitive materials such as PMMA or PET.

12 Claims, 32 Drawing Sheets

(56) References Cited

U.S. PATENT DOCUMENTS

| | | | |
|---|---|---|---|
| 2004/0258929 A1* | 12/2004 | Glaubitt et al. | 428/446 |
| 2008/0268229 A1* | 10/2008 | Lee et al. | 428/323 |
| 2009/0015926 A1 | 1/2009 | Iwata et al. | |
| 2010/0165276 A1* | 7/2010 | David et al. | 349/122 |

FOREIGN PATENT DOCUMENTS

| | | | |
|---|---|---|---|
| DE | 602004012606 T2 | 4/2009 | |
| JP | 62098301 A | 5/1987 | |
| JP | 05013021 A | 1/1993 | |
| JP | 07318702 A | 12/1995 | |
| JP | 2006327187 A | 12/2006 | |
| JP | 2007171405 A | 7/2007 | |
| JP | 2007283294 A | 11/2007 | |
| JP | 2008168286 A | 7/2008 | |
| WO | 2007053772 A1 | 5/2007 | |
| WO | 2008021817 A2 | 2/2008 | |

OTHER PUBLICATIONS

Zhang, X-T, et al., "Self-Cleaning Particle Coating with Antireflection Properties," Chemistry of Materials, American Chemical Society, Jan. 14, 2005, pp. 636-700, vol. 17, No. 3.

English abstract of JP2007171405 (A).

English abstract of JP2008168286 (A).

Chinese Patent App. No. 201080044530.6, Office Action, dated May 6, 2014.

Japanese Patent App. No. 2012-521993, Office Action, dated Jan. 28, 2014.

English Abstract of JP 07318702, dated Dec. 8, 1995.

English Abstract of JP 2007283294, dated Nov. 1, 2007.

English Abstract JP 2006327187, dated Dec. 7, 2006.

English Abstract of JP 62098301A, Jan. 22, 1993.

English Abstract of JP 05013021A, May 7, 1987.

* cited by examiner

METHOD FOR PRODUCING COATINGS HAVING ANTI-REFLECTION PROPERTIES

This patent application is a U.S. national stage application of PCT international application PCT/EP2010/004076 filed on 6 Jul. 2010 and claims priority of German patent document 10 2009 035 797.1 filed on 31 Jul. 2009, the entirety of which is incorporated herein by reference.

FIELD OF THE INVENTION

The invention relates to a process for producing coatings with antireflection properties. The invention also relates to a process for producing coatings which additionally have condensation-reducing, superhydrophilic and/or self-cleaning functions.

BACKGROUND OF INVENTION

Coatings with antireflection properties are produced by many different techniques. One example of these is the sol-gel technique. Such coatings may have a high transparency and high mechanical stability.

For instance, document US 2008/0268229 A1 describes such coatings, but these can be produced only by the multiple application of several different coating compositions. In addition, the achievement of sufficient stability requires a thermal treatment at 550° C. As a result, these coatings are unsuitable for thermally sensitive substrates.

As a result of the number of steps required and different coating compositions, these processes are costly and inconvenient and are also unsuitable for large areas.

Thermally sensitive substrates are usually coated with the aid of gas phase deposition, which is likewise a costly and inconvenient process.

Problem

The problem addressed by the invention is that of specifying a process which allows the production of coatings of antireflection coating in a simple manner, and also to thermally sensitive substrates. In addition, the process is to enable generation of surfaces with superhydrophilic and anticondensation properties in the same way.

SUMMARY OF INVENTION

This problem is solved by the inventions having the features of the independent claims. Advantageous developments of the inventions are characterized in the dependent claims. The wording of all claims is hereby incorporated into this description by reference. The invention also comprises all viable and especially all mentioned combinations of independent and/or dependent claims.

Individual process steps are described in detail hereinafter. The steps need not necessarily be performed in the sequence specified, and the process to be outlined may also have further unspecified steps.

The invention relates to a process for producing coatings with antireflection properties. In a first step, a composition is produced from at least one kind of nanoparticles and at least one solvent. "Kind of nanoparticles" is understood in the context of the invention to mean an amount of nanoparticles which correspond in terms of their characteristic parameters such as size (mean diameter, size distribution), chemical composition, internal structure (porosity, crystallinity), any surface modification. Typically, such parameters can be established unambiguously via the production process for the nanoparticles.

Nanoparticles are understood in the context of the invention to mean particles which have a mean particle diameter of less than 1 μm but more than 1 nm (mean particle size measured by HTEM), preferably of less than 250 nm, more preferably less than 100 nm. The particles preferably have a diameter between 1 and 50 nm.

The composition can be accomplished, for example, by dispersing the nanoparticles in an appropriate solvent or solvent mixture. The composition preferably has a total content of nanoparticles of more than 1% by weight, preferably more than 2% by weight, more preferably between 1% by weight and 10% by weight, especially between 2% by weight and 5% by weight.

The composition more preferably comprises at least two kinds of nanoparticles which differ in at least one property selected from size (mean diameter, size distribution), chemical composition, internal structure (porosity, crystallinity), zeta potential.

In a preferred embodiment of the invention, the at least two kinds of nanoparticles differ in their mean particle size at least by a factor of 2, preferably by a factor of 2 to 10 (measured with an ultrafine particle analyzer).

At least one kind of nanoparticles preferably comprises nanoparticles stabilized by a carboxylic acid. The stabilization of nanoparticles prevents the formation of agglomerates, which can lead to cloudiness in the coating. At the same time, the charge of the nanoparticles also determines the interaction thereof with one another or, in the case of use of several kinds of nanoparticles, also the interaction between the different kinds of nanoparticles. In the case of stabilization by a carboxylic acid, it is assumed that the carboxylic acid adds on to the surface of the nanoparticles. As a result, the particles receive a relatively inert surface. Suitable carboxylic acids are all mono- and polybasic carboxylic acids having 2-8 carbon atoms, i.e., for example, acetic acid, propionic acid, oxalic acid, glutaric acid, maleic acid, succinic acid, phthalic acid, adipic acid, suberic acid. Preferentially suitable are the hydroxycarboxylic acids and fruit acids, for example glycolic acid, lactic acid, citric acid, malic acid, tartaric acid and gluconic acid. Particular preference is given to acids which can be removed in the course of treatment at low temperatures, for example acetic acid, propionic acid or oxalic acid. The carboxylic acid also alters the surface charge of the particles.

In a further embodiment of the invention, the nanoparticles comprise one or more oxides of one or more metals or semimetals selected from Mg, Si, Ge, Al, B, Zn, Cd, Ti, Zr, Ce, Sn, In, La, Fe, Cu, Ta, Nb, V, Mo or W. The nanoparticles preferably comprise compounds selected from $TiO_2$, $SiO_2$, $ZrO_2$, $SnO_2$, $Al_2O_3$, AlOOH, $Ta_2O_5$, indium tin oxide (ITO), antimony tin oxide (ATO), fluorine-doped tin oxide (FTO).

In a further preferred embodiment, the composition comprises at least nanoparticles composed of $SiO_2$ and at least one further kind of nanoparticles which preferably do not consist of $SiO_2$. Particular preference is given to compositions comprising $SiO_2$ nanoparticles with $TiO_2$ nanoparticles and/or ITO nanoparticles.

In a preferred embodiment, the ratio of $SiO_2$ nanoparticles to the further kinds or the further kind of nanoparticles in % by weight is between 1:1 and 20:1, preferably between 4:1 and 10:1, more preferably between 5:1 and 7:1.

In the above preferred embodiment, it is particularly advantageous when the $SiO_2$ nanoparticles are much larger than the further kind(s) of nanoparticles. Advantageously, they are of at least twice the mean particle size, preferably even 2 to 10 times larger.

In a further embodiment of the invention, the composition comprises at least two solvents. These are advantageously solvents having a boiling point of below 200° C., preferably of below 150° C. (under standard conditions). Preference is given to polar solvents.

Advantageously, the composition comprises at least one solvent selected from the group comprising $C_1$-$C_8$-alcohols (such as methanol, ethanol, propanol, 2-propanol, 1-methyl-2-propanol, butanol, 2-butanol, ethylene glycol), $C_1$-$C_8$-ketones (such as acetone, 2-butanone, 2-pentanone, 3-pentanone, 2-methyl-2-butanone), $C_1$-$C_8$-aldehydes (ethanal, propanal, butanal, pentanal), water. It is also possible to use other polar solvents, such as tetrahydrofuran or ethers. It is also possible to use mixtures of these solvents.

In a further embodiment, the composition comprises at least two solvents. In a preferred embodiment, the main constituent of the composition is nonaqueous solvents, especially alcohols.

In a further embodiment, the composition does not comprise any further additives, such as wetting agents or polymers. This means that the composition is substantially free of organic substances which cannot be removed by a thermal treatment above 50° C., preferably above 80° C.

Normally, the composition can be obtained by mixing one or more suspensions of the nanoparticles with one or more solvents. An establishment of a particular pH is unnecessary.

In the next step, the composition is applied to a substrate. The substrate used may be any desired surface suitable for coatings. Preference is given to transparent substrates such as glass, polycarbonates (PC), polymethyl methacrylates (PMMA), polyethylene (PE), polystyrene, polyvinyl chloride or similar transparent polymers.

For application of the composition, it is possible to use any desired techniques for application of liquid or viscous compositions, for example spraying, dipping, bar coating, rolling.

The thickness of the composition applied is preferably between 20 and 600 nm, depending on the desired wavelength. Preference is given to a multiple of one quarter of the desired wavelength, i.e., for example, 125 nm for a wavelength of 500 nm. The thermal treatment can also alter the thickness.

In a further preferred embodiment, the composition is applied only once. This means that an inventive coating can be obtained after only one performance of the process.

After the application, the coated substrate is subjected to a thermal treatment.

In a further embodiment, the thermal treatment is performed below 200° C. (low-temperature treatment), preferably between 50° C. and 150° C., more preferably between 80° C. and 120° C. The treatment may take between 5 minutes and 5 hours, preferably between 30 minutes and 2 hours. This embodiment enables the production of antireflection coatings on thermally sensitive substrates, such as polymers.

The coatings produced have high mechanical stability, high transmission (>97%), low reflection in the visible region (<2%).

In a further embodiment, the thermal treatment is performed at above 400° C. (high-temperature treatment), more preferably between 400° C. and 700° C., more preferably between 450° C. and 600° C. The treatment may take from 1 minute to 2 hours. The heating rate used may be 1 to 10° C./min, preferably 5° C./minute. The treatment at high temperature leads not only to the formation of antireflection coatings, but the layers may also additionally have anticondensation and superhydrophilic properties. These can be promoted by better bonding of the nanoparticles of the coating at the high temperatures, and the formation of cavities and pores. The two thermal treatments can also be employed in succession.

The process is especially suitable for industrial manufacture. Thus, it is necessary to produce only one composition and, in a preferred embodiment, the coatings can be obtained in only one coating step. As a result, it is also possible to coat large areas in a simple manner. The thermal treatment at low temperature also enables the coating of thermally sensitive substrates.

The inventive coatings can also be applied to coated substrates. In addition, it is also possible to apply further coatings.

The invention also relates to an antireflection coating obtained by the process according to the invention. Advantageously, it is a coating comprising $SiO_2$ nanoparticles and at least one further kind of nanoparticles, preferably $TiO_2$ or ITO nanoparticles.

In a preferred embodiment of the invention, the coating comprises at least two kinds of nanoparticles which differ in their mean particle size at least by a factor of 2, preferably by a factor of 2 to 10.

In a further embodiment of the invention, the coating comprises a homogeneous distribution of the at least 2 kinds of nanoparticles. This is promoted especially by virtue of the at least 2 kinds of nanoparticles already being present as a mixture in the composition before application to the substrate. As a result, the two kinds of particles can agglomerate with one another. They advantageously agglomerate in such a way that one kind of nanoparticles homogeneously covers the other kind of nanoparticles. In the presence of a difference in size, there is homogeneous coverage of the larger nanoparticles by the smaller nanoparticles. This enables the production of a homogeneous coating. Such an agglomeration of the nanoparticles can also already be detected in the composition.

The invention also relates to a composition which has at least one first kind of nanoparticles homogeneously covered by a second kind of nanoparticles; more particularly, this is a composition as described for the process.

In a preferred embodiment, the composition comprises at least two kinds of nanoparticles which differ in their mean particle size at least by a factor of 2, preferably by a factor of 2 to 10, the smaller particles homogeneously covering the larger particles, i.e. having agglomerated homogeneously on the surface thereof.

The invention also relates to the use of a coating or coating produced by the process described for antireflection coatings, especially for transparent substrates, optical elements, lenses, spectacle glass, visual display units, mobile phone displays, smartphones, touchscreens.

Further details and features are evident from the description of preferred working examples which follows, in conjunction with the dependent claims. In this context, the respective features can be implemented alone, or several in combination with one another. The ways of solving the problem are not restricted to the working examples. For example, stated ranges always include all—unspecified—intermediate values and all conceivable sub-intervals.

The working examples are shown schematically in the figures. The same reference numerals in the individual figures refer to identical elements or elements of identical function or elements which correspond to one another in terms of their function. The individual figures show:

BRIEF DESCRIPTION OF THE DRAWINGS

FIG. 1-2 Reflection spectrum of the coatings on PMMA;
FIG. 1-3 Reflection spectrum of the coatings on glass;
FIG. 2-1 Transmission spectrum of the coatings on polycarbonate;
FIG. 2-2 Transmission spectra of the coatings on PMMA;
FIG. 2-3 Transmission spectrum of the coatings on glass;
FIG. 3-1a Reflection spectrum of coatings comprising ITO (visible light region) on polycarbonate;
FIG. 3-1b Reflection spectrum of coatings comprising ITO (IR region) on polycarbonate;
FIG. 3-2a Reflection spectrum of coatings comprising ITO (visible light region) on PMMA;
FIG. 3-2b Reflection spectrum of coatings comprising ITO (IR region) on PMMA;
FIG. 3-3a Reflection spectrum of coatings comprising ITO (visible light region) on glass;
FIG. 3-3b Reflection spectrum of coatings comprising ITO (IR region) on glass;
FIG. 4-1a Transmission spectrum of coatings comprising ITO (visible light region) on polycarbonate;
FIG. 4-1b Transmission spectrum of coatings comprising ITO (IR region) on polycarbonate;
FIG. 4-2a Transmission spectrum of coatings comprising ITO (visible light region) on PMMA;
FIG. 4-2b Transmission spectrum of coatings comprising ITO (IR region) on PMMA;
FIG. 4-3a Transmission spectrum of coatings comprising ITO (visible light region) on glass;
FIG. 4-3b Transmission spectrum of coatings comprising ITO (IR region) on glass;
FIG. 5-1 EDX spectrum of composition S1;
FIG. 6-1 TEM image of composition S1;
FIG. 6-2 TEM image of composition S2;
FIG. 6-3 TEM image of composition S3;
FIG. 6-4a TEM image of composition S4 (ITO);
FIG. 6-4b TEM image of composition S4 (ITO);
FIG. 7-1 Measurement of photocatalytic activity;
FIG. 8-1 Comparison of the anticondensation capacity of different samples a) glass b) S1 c) S2 d) S3;
FIG. 9-1 AFM analysis of the coating with composition L on PMMA;
FIG. 9-2 AFM analysis of the coating with composition H-2 on PMMA;
FIG. 9-3 AFM analysis of the coating with composition S2 on PMMA;
FIG. 9-4 AFM analysis of the coating with composition L on polycarbonate;
FIG. 9-5 AFM analysis of the coating with composition H on polycarbonate;
FIG. 9-6 AFM analysis of the coating with composition S2 on polycarbonate;
FIG. 9-7 AFM analysis of the coating with composition L on glass;
FIG. 9-8 AFM analysis of the coating with composition H on glass;
FIG. 9-9 AFM analysis of the coating with composition S2 on glass;
FIG. 10-1 Microscope image (SEM) of a coating with composition S2 (20 000×, scale 1.3 µm);
FIG. 10-2 Microscope image (SEM) of a coating with composition S2 (50 000×, scale 0.5 µm);
FIG. 10-3 Microscope image (SEM) of a coating with composition S2 (60×, scale 500 µm);
FIG. 10-4 Microscope image (SEM) of a coating with composition S2 (5000×, scale 5 µm);
FIG. 10-5 Microscope image (SEM) of a coating with composition S2 (1000×, scale 25 µm);
FIG. 10-6 Microscope image of a coating with composition S2 (2000×, scale 13 µm);
FIG. 10-7 Microscope image (SEM) of a coating with composition S2 (10 000×, scale 2.5 µm);
FIG. 10-8 Microscope image (SEM) of a coating with composition S2 (20 000×, scale 1.3 µm);
FIG. 11-1 EDX analysis of a coating with composition S2;
FIG. 11-2 EDX analysis of a coating with composition S2 after scratching the site with a pencil;
FIG. 12-1 Reflection spectrum of a coating with composition S5 on glass;
FIG. 12-2 Transmission spectra of a coating with composition S5 on glass;
FIG. 12-3 Reflection spectra of a coating with composition S5 on polycarbonate;
FIG. 12-4 Reflection spectrum of a coating with composition S5 on polyethylene (PE), produced by a roll-to-roll coating process;
FIG. 12-5 Reflection spectra of coatings of different modifications of composition S5 on glass;
FIG. 12-6 Reflection spectra of coatings with composition S5 and S6 on glass;
FIG. 12-7 Reflection spectra of coatings with compositions S5 and S7 on glass;
FIG. 12-8 Reflection spectra of coatings with compositions S5 and S8 on glass;
FIG. 12-9 Transmission spectra of coatings with compositions S5 and S8 on glass;
FIG. 12-10 Reflection spectra of a glass substrate coated with S2 on one side (A) and on both sides (B);
FIG. 13-1 Schematic diagram of the coating;
FIG. 13-2a TEM image of a sol of composition (S1);
FIG. 13-2b HTEM detail of a sol of composition (S1);
FIG. 13-3 TEM image of a sol of composition (S1).

DETAILED DESCRIPTION OF INVENTION

Figure 1:
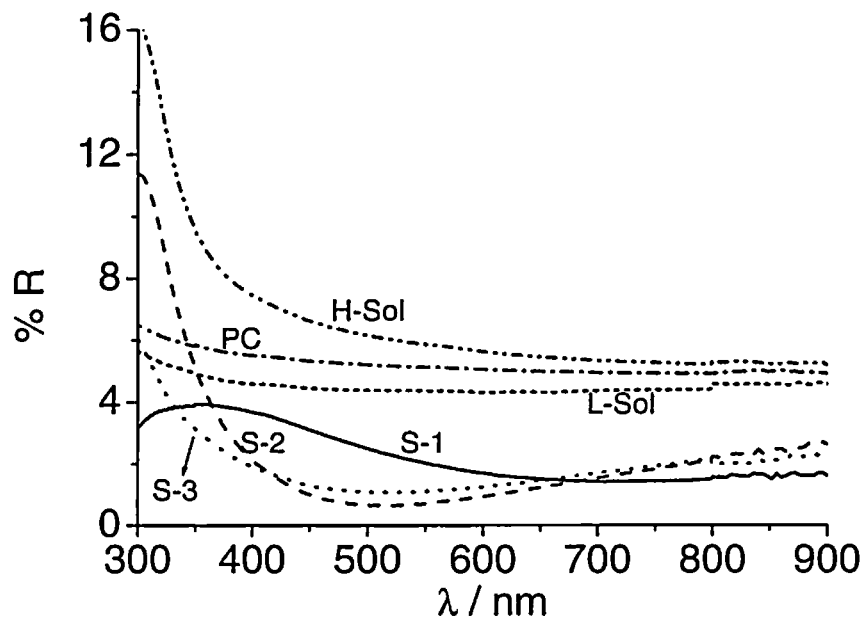
FIG. 1-1 Reflection spectrum of the coatings on polycarbonate (PC)

The compositions for production of the coatings comprise, in a preferred embodiment, $SiO_2$ nanoparticles with a further kind of nanoparticles of different composition, preferably ITO or $TiO_2$. In order to increase the porosity, the two particles do not have the same mean particle size. Advantageously, the $SiO_2$ nanoparticles are 2-10 times larger than the other nanoparticles.

A suspension of $SiO_2$ nanoparticles preferably stabilized with a carboxylic acid and having a proportion of 20% to 50% by weight is dispersed in at least one solvent. The solvent is preferably ethanol, propanol, 2-propanol, or a mixture of two of these alcohols in a ratio of 1:3 to 3:1, preferably 1:1 (by volume).

Added to this mixture is a suspension of the second kind of nanoparticles with a proportion of approx. 5% by weight, which are dispersed in an alcohol or an alcohol-water mixture in a ratio of 1:1 (volume).

The total proportion of nanoparticles in the composition is at least 0.5% by weight, preferably between 0.8 and 5% by weight, preferably between 2 and 4% by weight. The ratio between $SiO_2$ and the other kind of nanoparticles is between 10:1 and 5:1 in % by weight. The other kind of nanoparticles can also influence the absorption of the coating, for example ITO particles in the IR region. The other kind of nanoparticles are preferably $TiO_2$ or ITO.

In a preferred embodiment, the $TiO_2$ particles are produced by a hydrothermal method. For this purpose, a titanium alkoxide, preferably titanium isopropoxide, is added to an alcohol, preferably ethanol, n-propanol, isopropanol, and hydrolyzed under acidic conditions with a substoichiometric amount of water. Advantageously, the addition of the water is preceded by addition of an alcohol or polyalcohol, especially ethylene glycol. The hydrolysis is effected thereafter with heating and under pressure (hydrothermal reaction), for example by heating in a closed vessel. Preferred temperatures are above 100° C., preferably between 150° C. and 300° C. The resulting particles are then washed with aprotic solvents and dried at temperatures below 100° C., preferably between 40° C. and 100° C. The resulting powders (type 2) are notable for good dispersibility and particularly advantageous properties for production of the antireflection coatings.

The following compositions were produced:

| Composition | Particles 1 | Particles 2 |
|---|---|---|
| S1 | $SiO_2$, 15 nm, acid-stabilized | $TiO_2$, 5 nm, produced by reflux method (type 1) |
| S2 | $SiO_2$, 15 nm, acid-stabilized | $TiO_2$, 5 nm, produced by hydrothermal method (type 2) |
| S3 | $SiO_2$, 15 nm, acid-stabilized | $TiO_2$, 3-4 nm, produced by hydrothermal method (type 3) |
| H1 | $TiO_2$ as S1 | — |
| H2 | $TiO_2$ as S2 | — |
| H3 | $TiO_2$ as S3 | — |
| L | $SiO_2$, 15 nm, acid-stabilized | — |
| S4 | $SiO_2$, 15 nm, acid-stabilized | ITO, produced from Nano-ITO c5000 S1N paste |
| ITO | ITO, produced from Nano-ITO c5000 S1N paste | — |
| S5 | $SiO_2$, 15 nm, acid-stabilized | $TiO_2$, type 2 |
| S6 | $SiO_2$, 30 nm, acid-stabilized | $TiO_2$ as S5 |
| S7 | $SiO_2$, 30 nm, base-stabilized | — |
| S8 | $SiO_2$ as S5 | $TiO_2$ (type 2) |

The compositions were applied to different substrates, such as glass, polycarbonate (PC), PMMA or PET.

The coated substrates were then subjected to a thermal treatment. The influence of a treatment at low temperature and of a treatment at high temperature was studied. Unless stated otherwise, the coated substrates hereinafter have been treated at low temperature.

FIG. 1-1 shows reflection spectra of the coatings of compositions S1, S2, S3, H1, H2, H3 and L on polycarbonate (PC). Compositions H1, H2 and H3 gave very similar spectra.

Figures 1, 2:
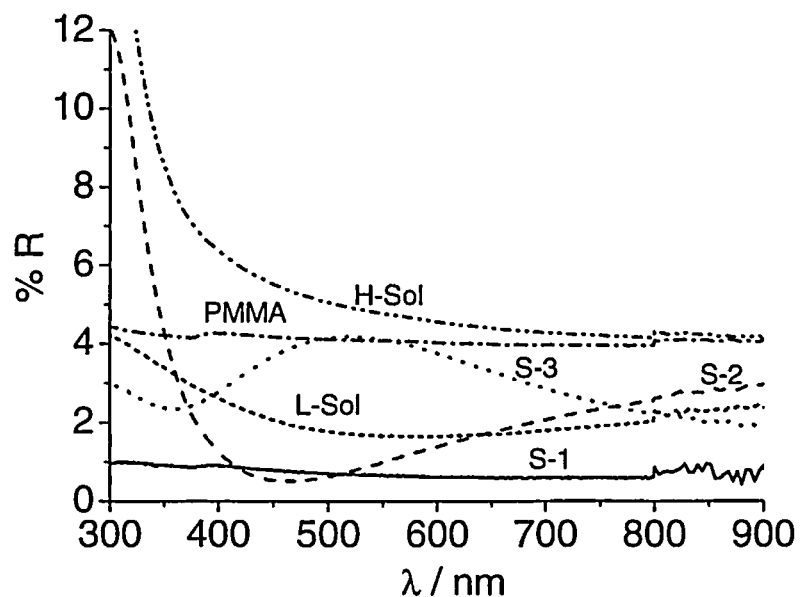

FIG. 1-2 shows reflection spectra of the coatings of compositions S1, S2, S3, H1, H2, H3 and L on PMMA. Compositions H1, H2 and H3 gave very similar spectra.

Figures 1, 2, 3:
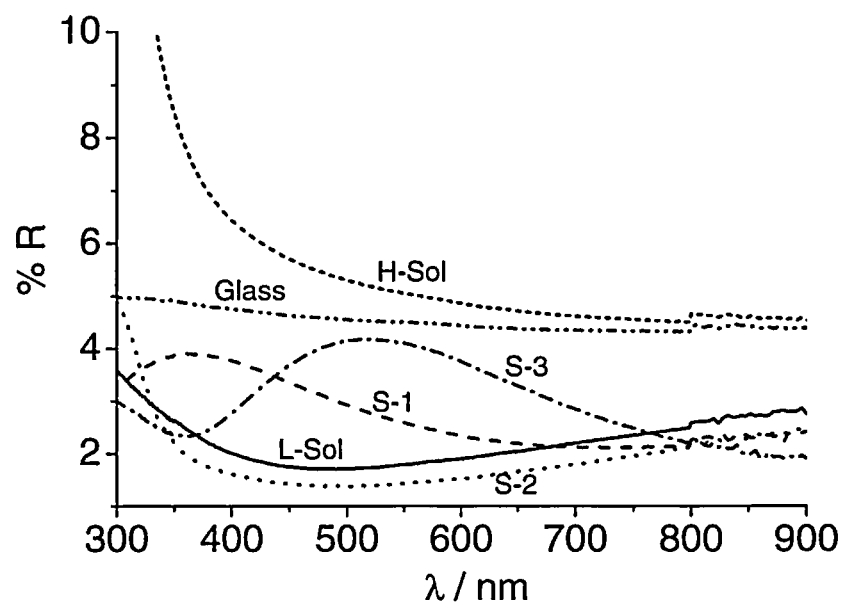
Figures 1, 2:
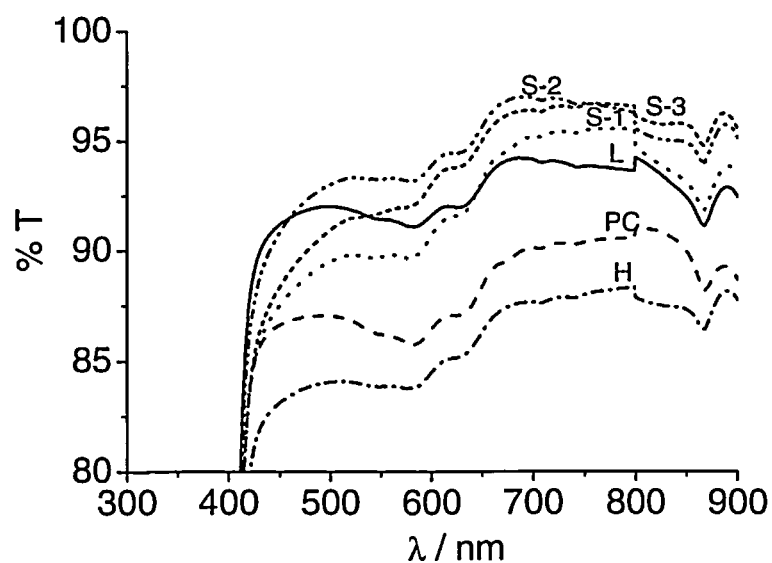
Figure 2:
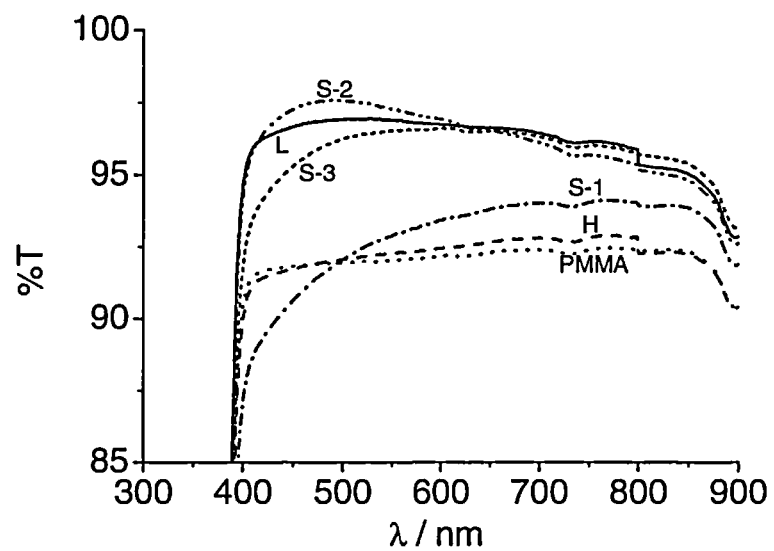
Figures 2, 3:
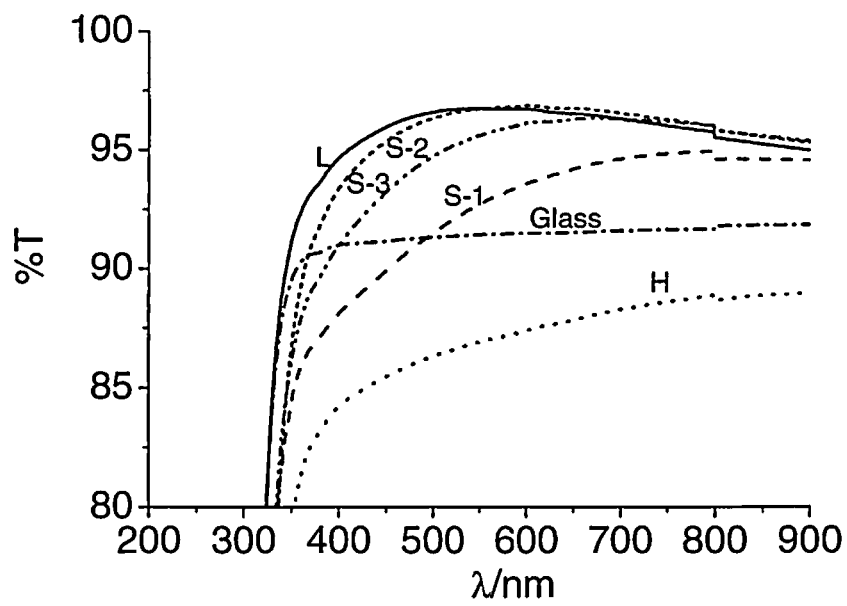

FIG. 1-3 shows reflection spectra of the coatings of compositions S1, S2, S3, H1, H2, H3 and L on glass. Compositions H1, H2 and H3 gave very similar spectra.

In all analyses, it is clearly evident that the coating produced with composition S2 has particularly advantageous properties.

FIGS. 2-1 to 2-3 show the transmission properties of the same samples.

Figures 1A, 3:
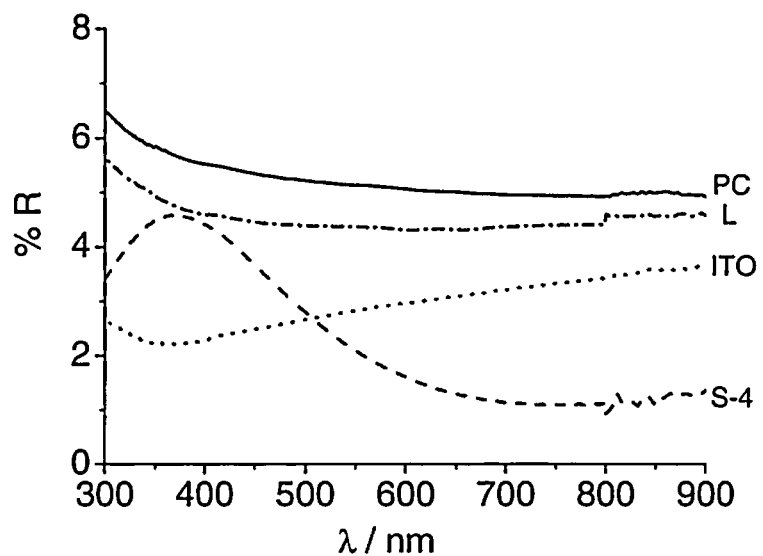
Figures 1B, 3:
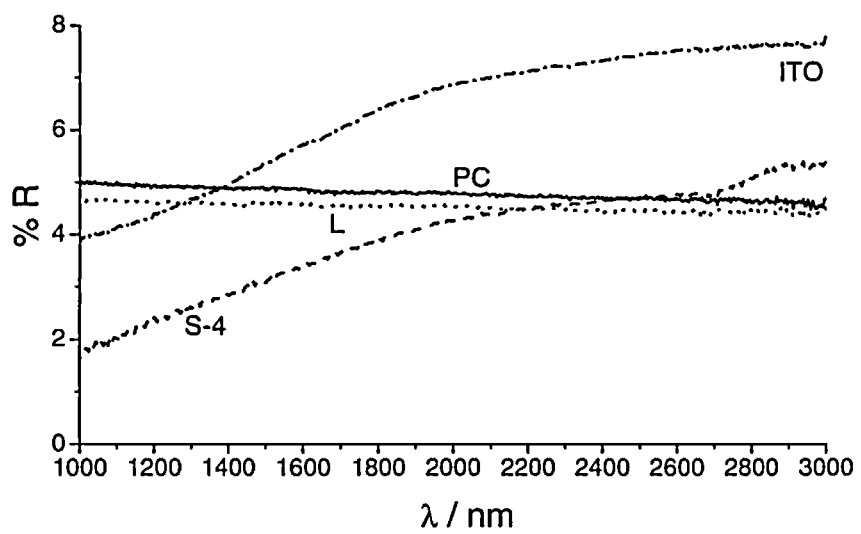
Figures 2A, 3:
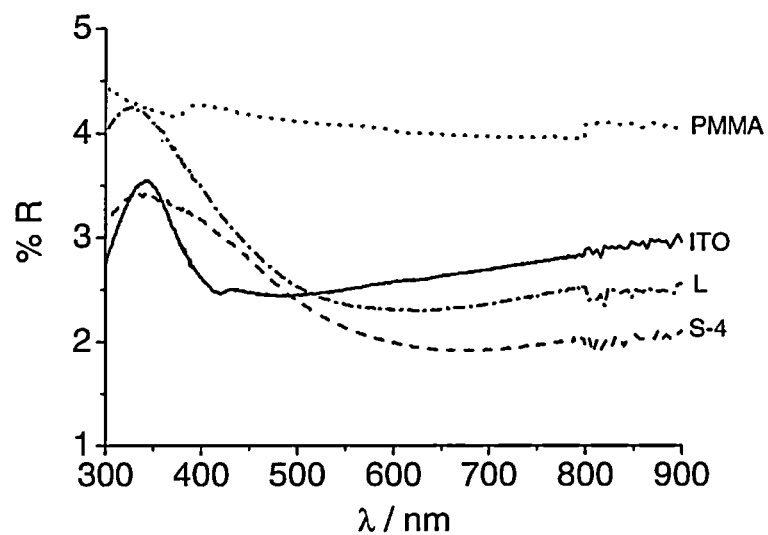
Figures 2B, 3:
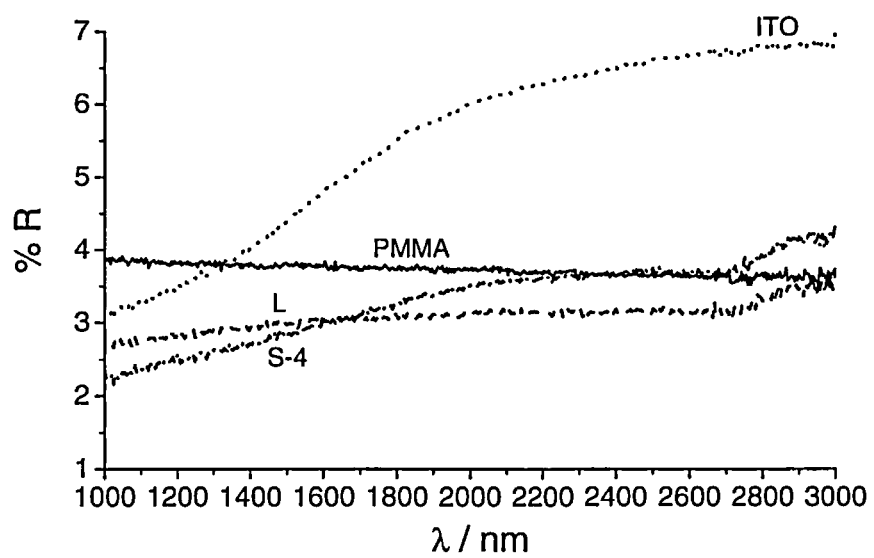
Figures 3, 3A:
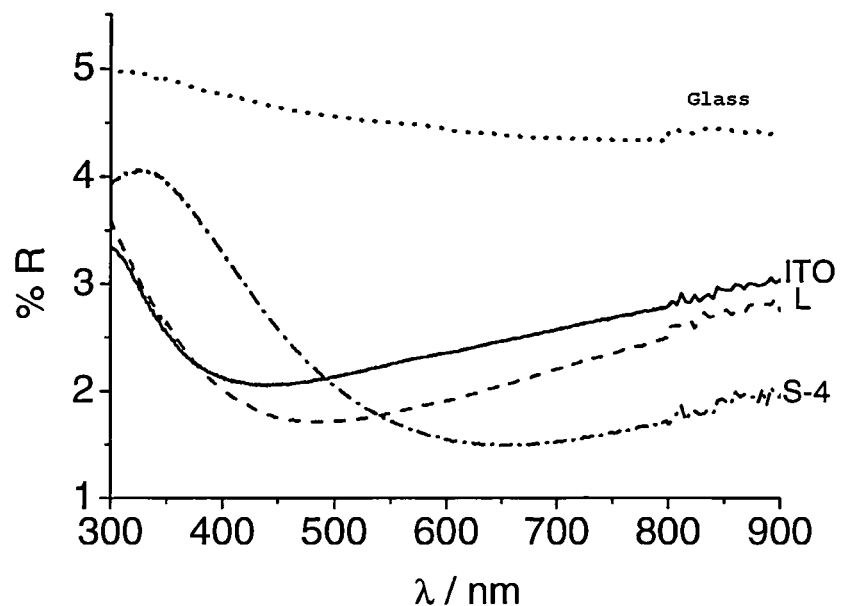
Figures 3, 3B:
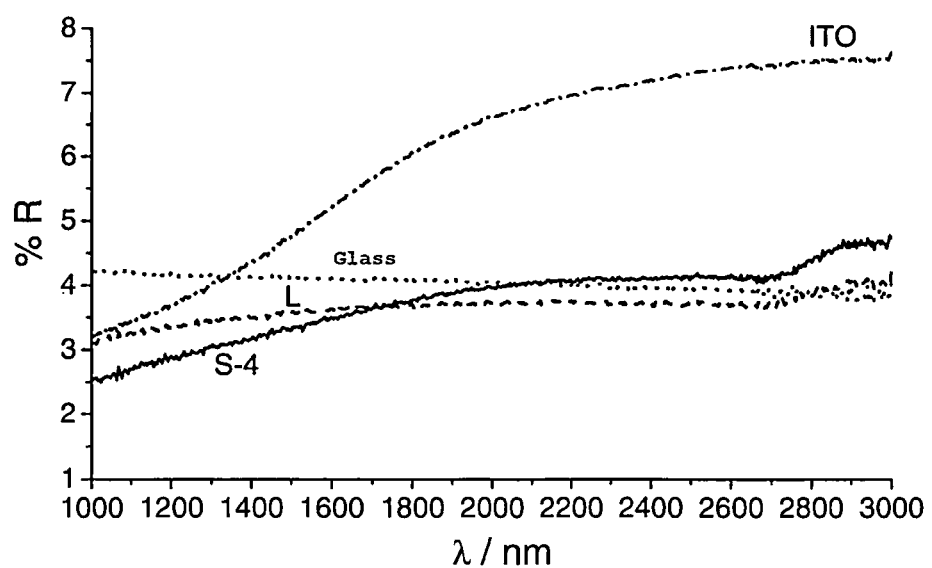

FIGS. 3-1*a* and 3-1*b* show the reflection spectrum of the coating of composition S4 in the region of visible light and in the infrared region (IR region) on polycarbonate compared to the uncoated substrate (polycarbonate: PC), of the coating with composition L and of a coating only of composition ITO. FIGS. 3-2*a, b* and 3-3*a,b* show the same analyses for coatings on PMMA and glass.

Figures 1A, 4:
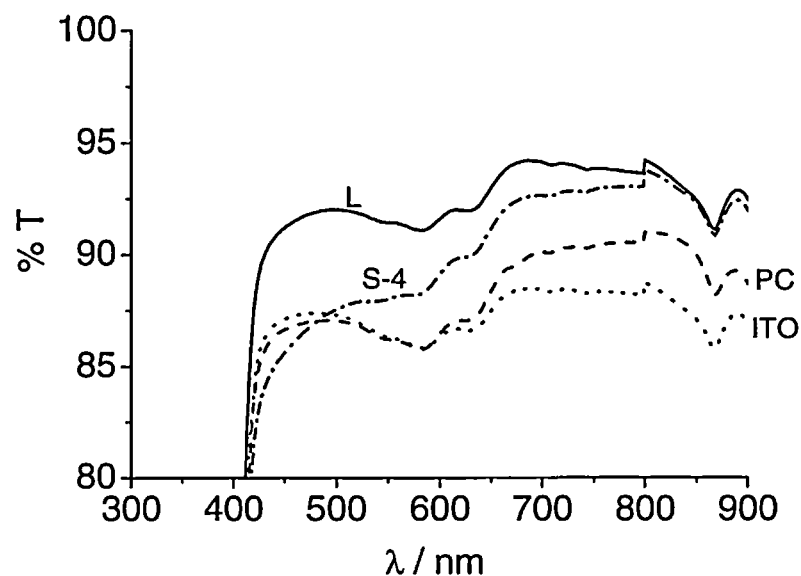
Figures 1B, 4:
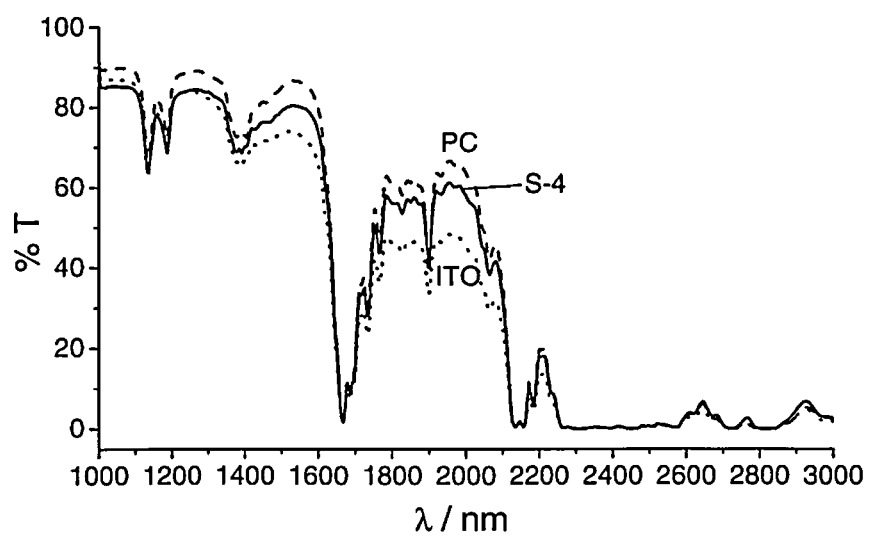
Figures 2A, 4:
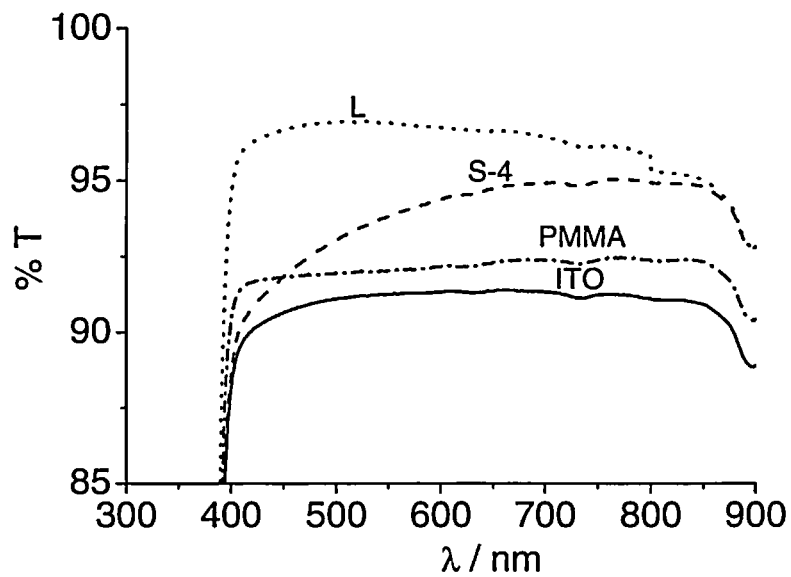
Figures 2B, 4:
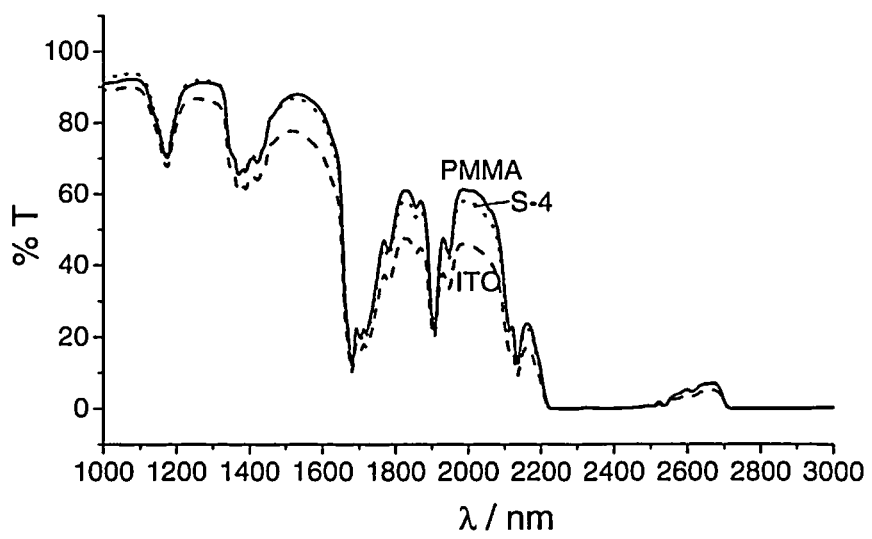
Figures 3A, 4:
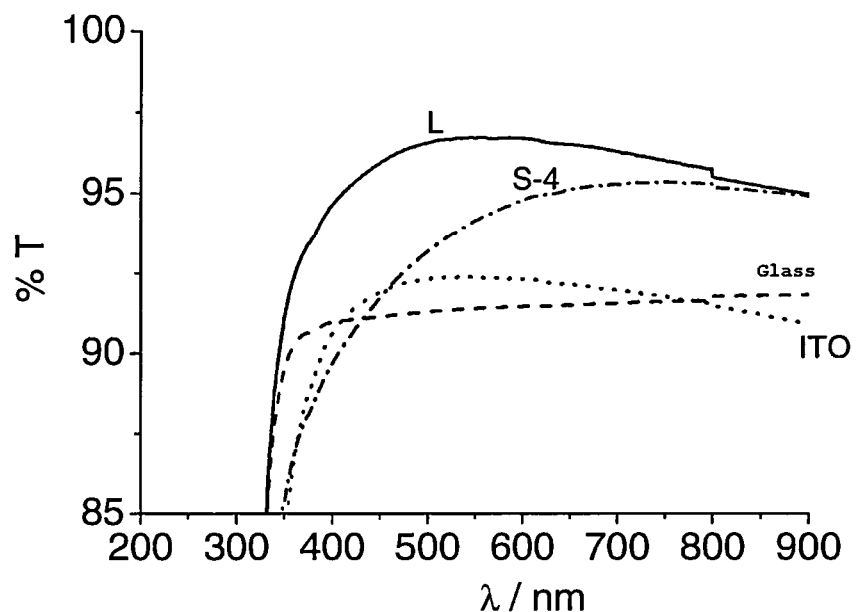
Figures 3B, 4:
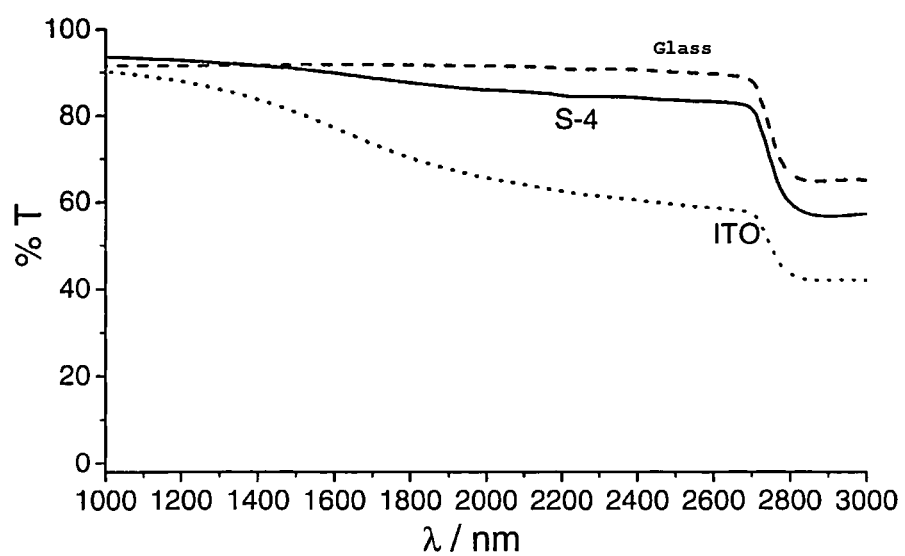

FIGS. 4-1*a,b*, 4-2*a,b* and 4-3*a,b* show the corresponding transmission spectra of the samples from 3-1*a,b*, 3-2*a,b* and 3-3*a,b*.

The coatings also have a high porosity. This has been confirmed by ellipsometry. The samples also have a very low contact angle with respect to water, especially of below 40° on glass.

Figures 1, 9:
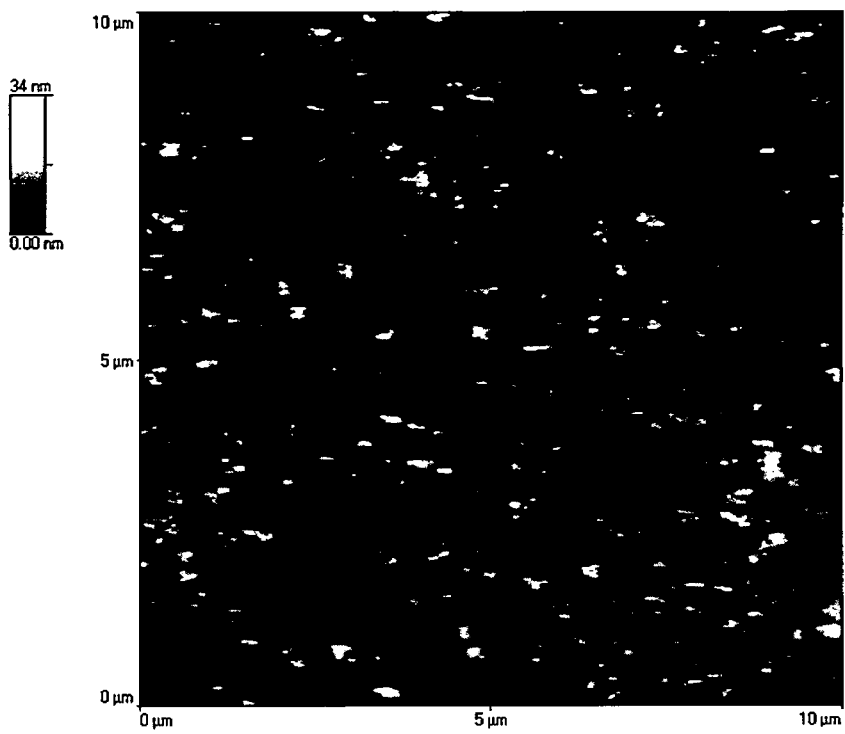
Figures 2, 9:
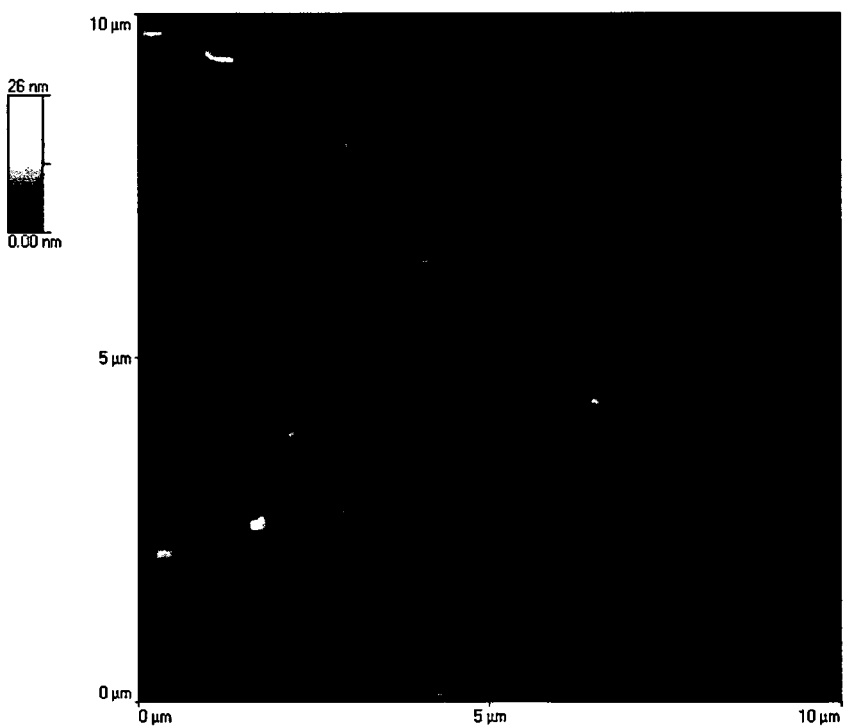
Figures 3, 9:
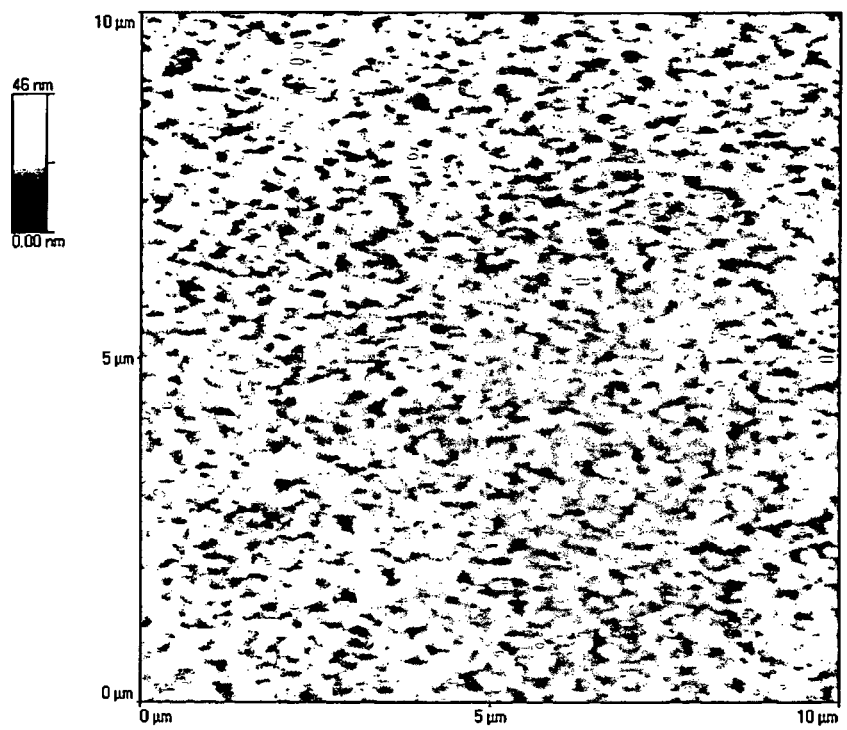
Figures 4, 9:
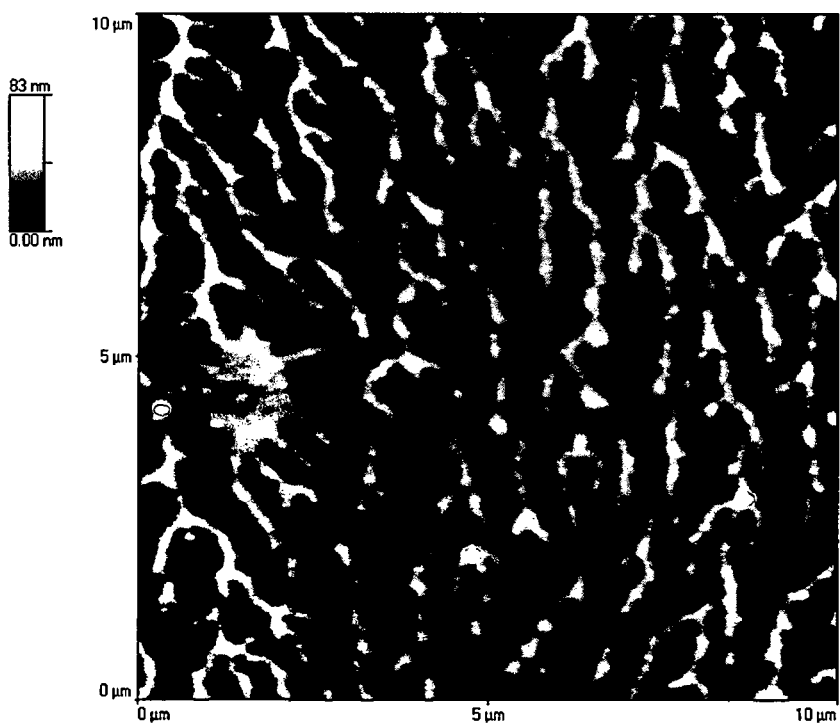
Figures 5, 9:
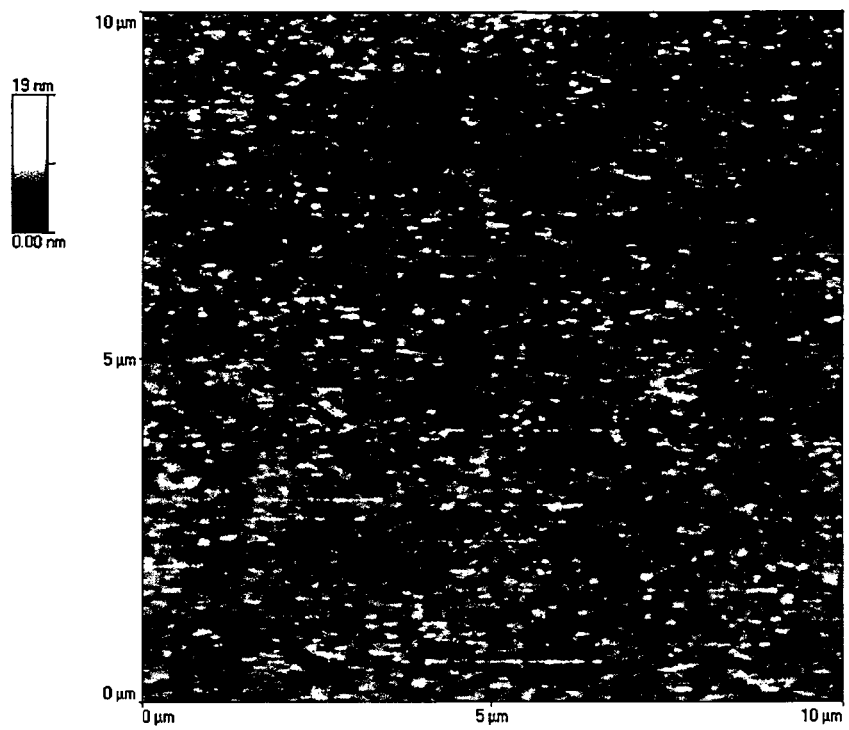
Figures 6, 9:
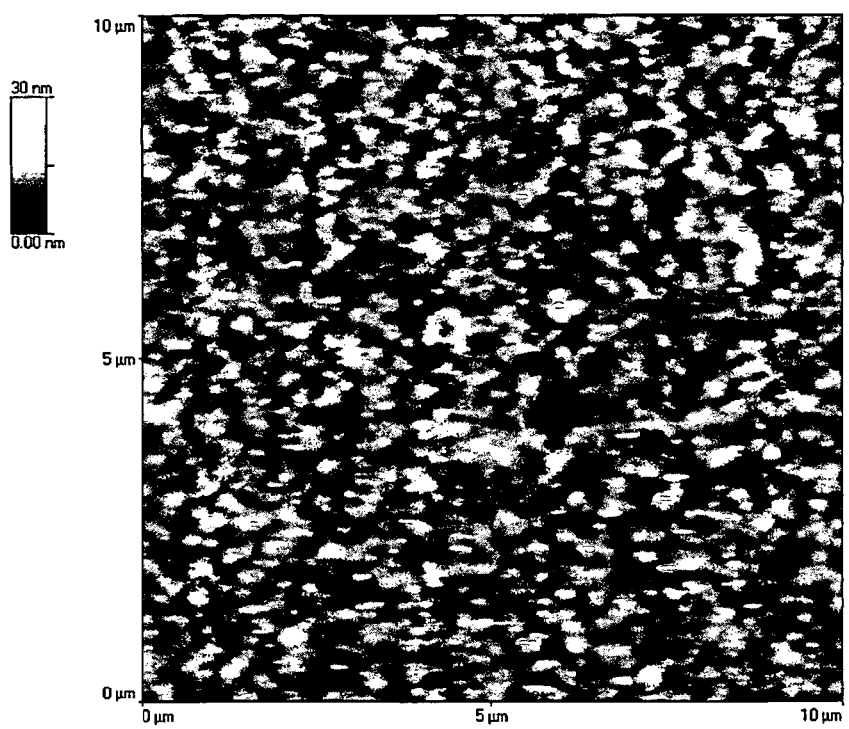
Figures 7, 9:
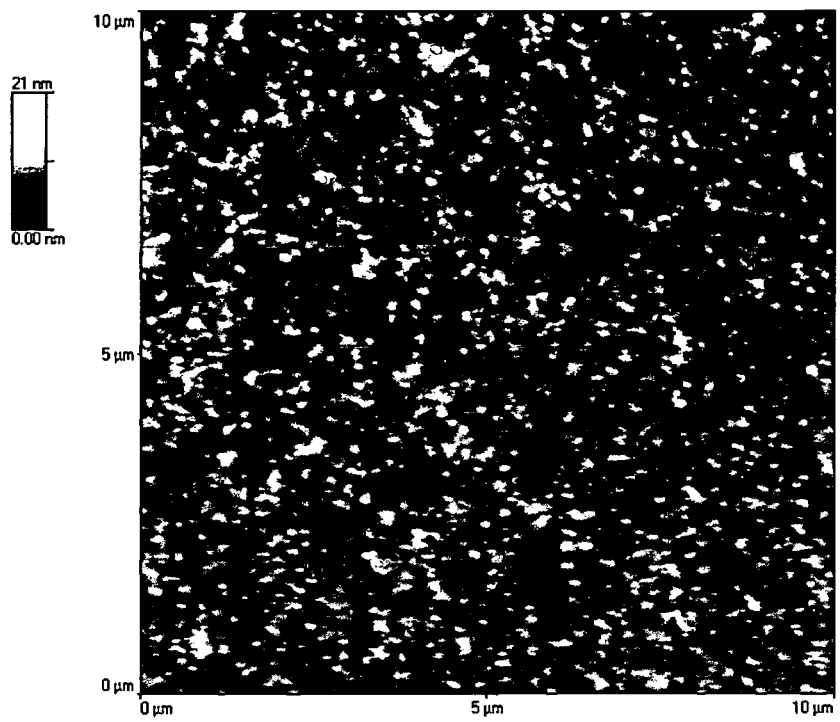
Figures 8, 9:
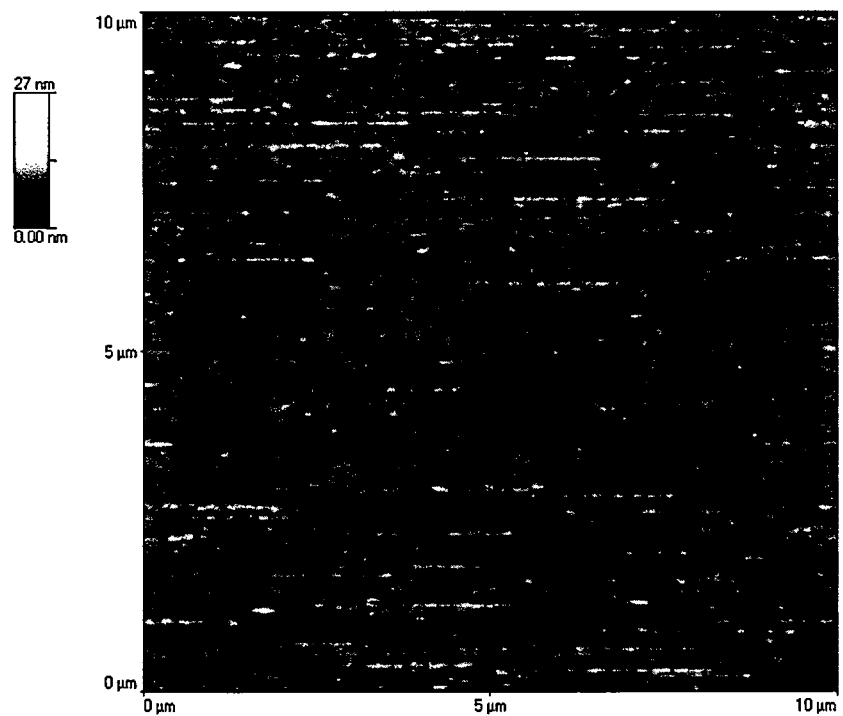
Figure 9:
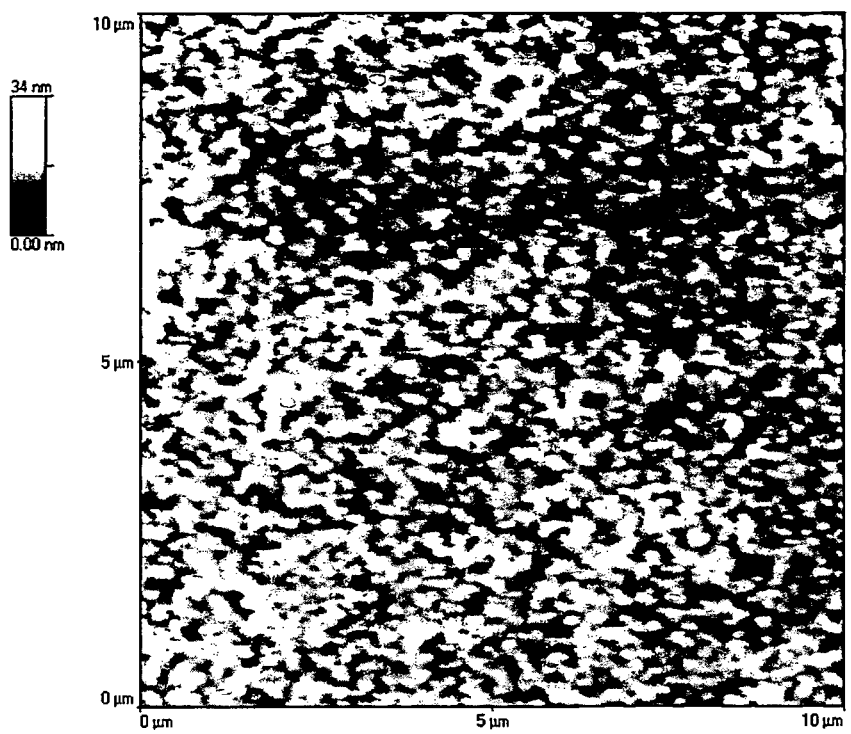

The roughness of the surfaces was also confirmed by AFM analyses. For instance, with the aid of AFM analyses, the mean roughness ($R_a$) and the root mean square roughness ($R_{RMS}$) of different coatings (produced by the low-temperature method) was determined. The roughness of the coating with S2 is much higher in almost all cases than the roughness of the corresponding coatings composed of compositions H-2 and L. The roughness of the coating with composition L on polycarbonate is higher, but the AFM image (FIG. 9-4) shows an inhomogeneous coating and the coating can also be detached easily. For all other coatings, a homogeneous surface is evident. The pores are distributed homogeneously.

| Composition | Substrate | FIG. | $R_a$ | $R_{RMS}$ |
|---|---|---|---|---|
| L | PMMA | 9-1 | 2.2272 | 3.1044 |
| H2 | PMMA | 9-2 | 0.6473 | 0.8989 |
| S2 | PMMA | 9-3 | 2.5585 | 3.3252 |
| L | PC | 9-4 | 8.3599 | 10.4023 |
| H2 | PC | 9-5 | 0.9590 | 1.2367 |
| S2 | PC | 9-6 | 2.1416 | 2.7637 |
| L | glass | 9-7 | 1.3493 | 1.7218 |
| H2 | glass | 9-8 | 0.9537 | 1.2872 |
| S2 | glass | 9-9 | 2.4477 | 3.1326 |

The properties of the coatings can be improved once again by the treatment at high temperature. The individual nanoparticles of the coating can probably form even more advantageous pores at this temperature.

Figures 1, 7:
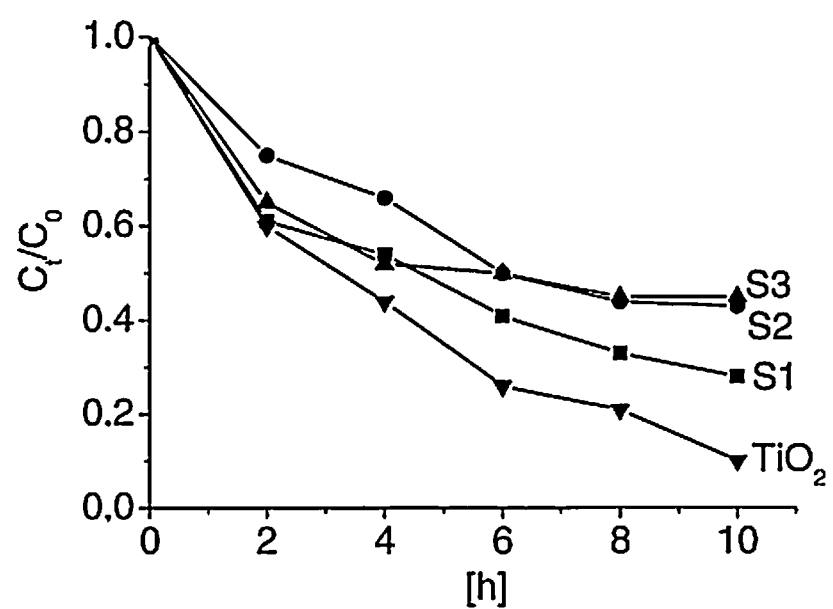

For instance, the coatings with S1, S2 or S3 have a photocatalytic activity which leads to the decomposition of organic substances on the surface. This is also referred to as a self-cleaning property. FIG. 7-1 shows the measurement of the photocatalytic activity of coatings on glass treated at a high temperature. All coatings have a similar activity, even though the coatings with S1, S2 and S3 have a much lower content of $TiO_2$ compared to the coating composed of pure $TiO_2$ (H).

At the same time, these coatings, probably due to the exceptional porosity thereof, are also superhydrophilic (contact angle 0°). The coatings with compositions S2 and S3 do not lose this property even after repeated wetting or after prolonged storage (several months). The coatings composed of composition H2 lose this property with time.

Figures 1, 8:
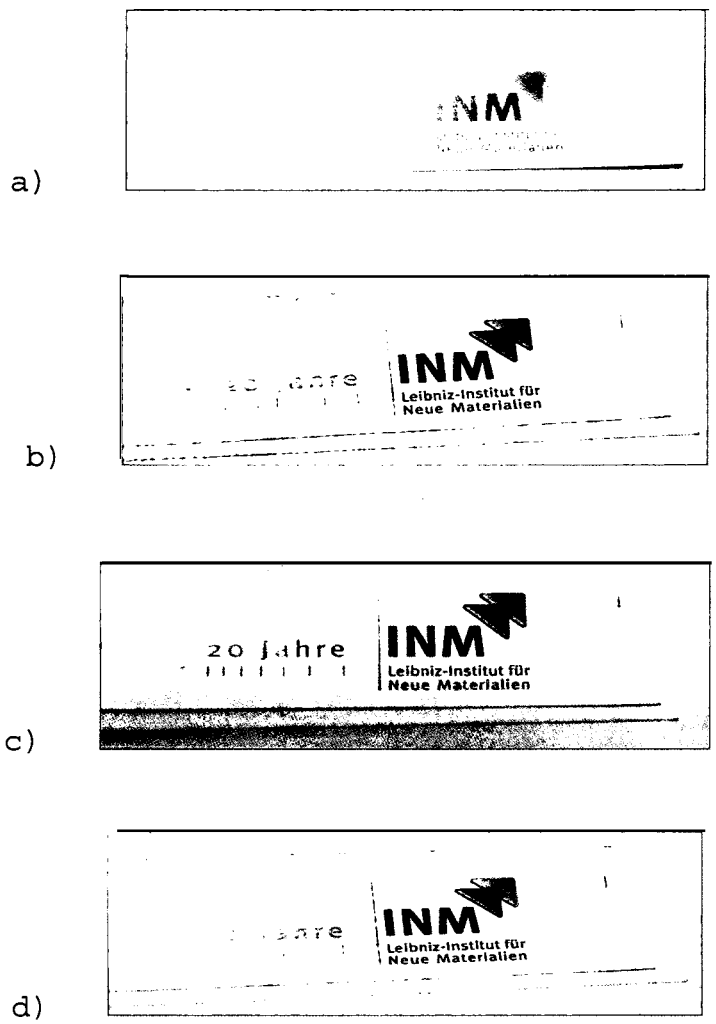

Superhydrophilicity also leads to anticondensation properties of the coatings. For instance, coatings composed of compositions S1, S2 and S3 (treated by high-temperature methods) clearly exhibit an anticondensation property (FIG. 8-1*a-d*).

In a further preferred embodiment, the composition is produced using a mixture of two alcohols, preferably of ethanol and 2-propanol, $SiO_2$ nanoparticles and $TiO_2$ nanoparticles, preferably $TiO_2$ nanoparticles of type 2 (composition S5).

Figures 1, 12:
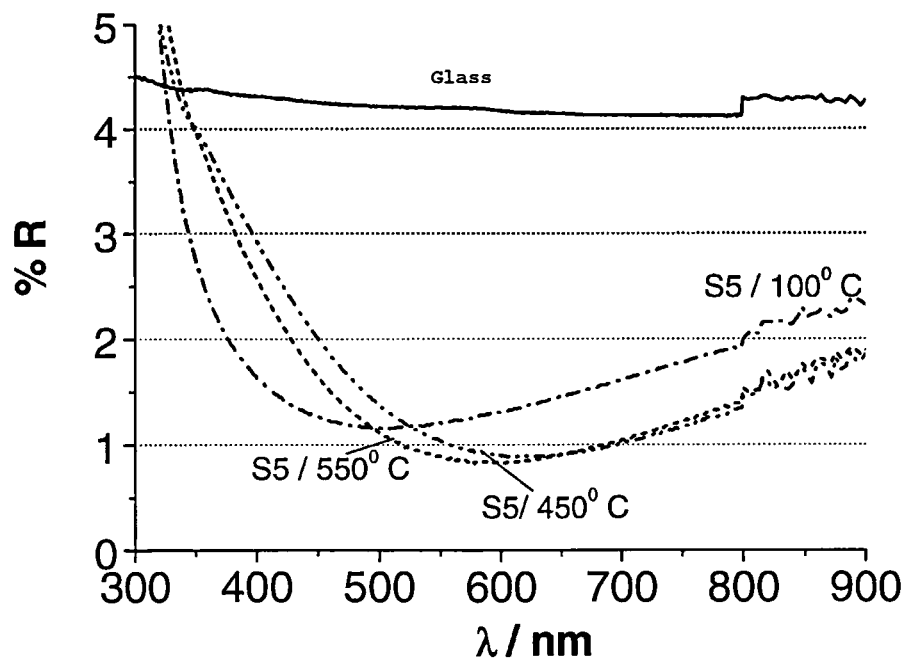
Figures 2, 12:
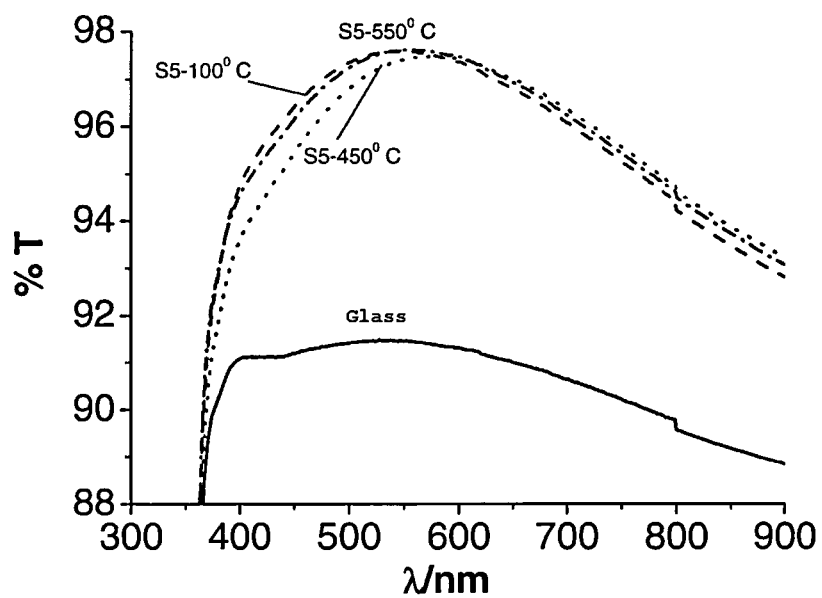
Figures 3, 12:
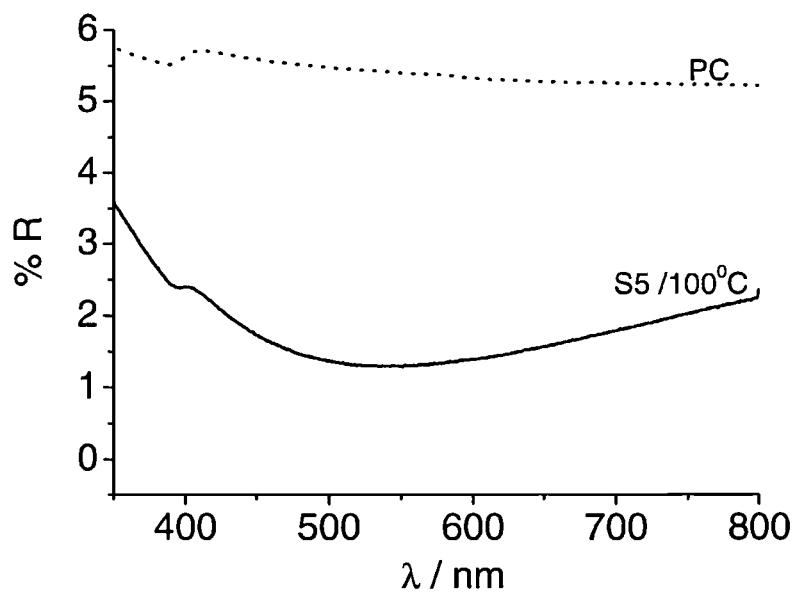
Figures 4, 12:
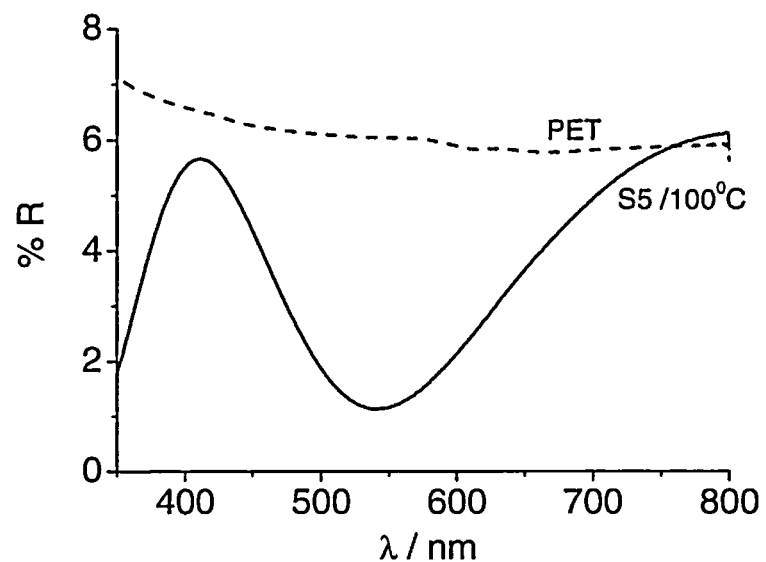
Figures 5, 12:
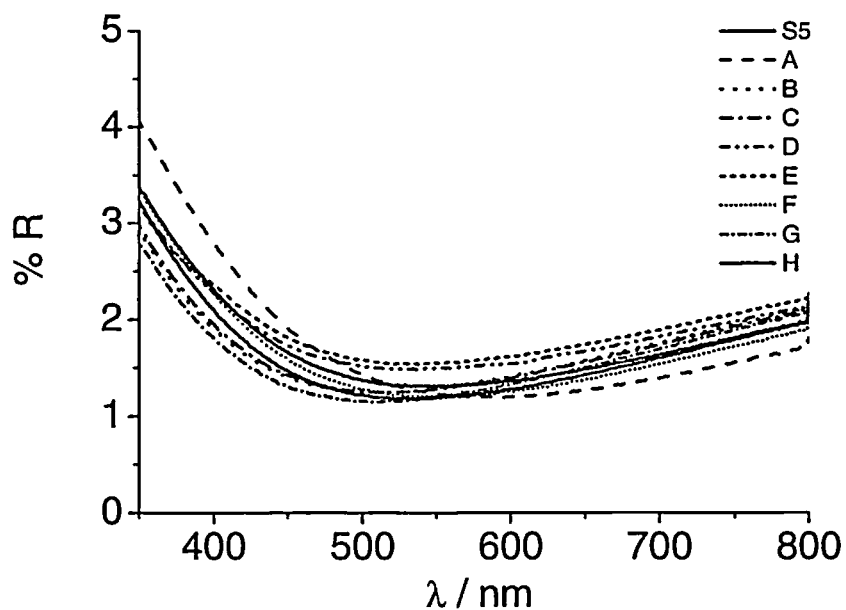
Figures 6, 12:
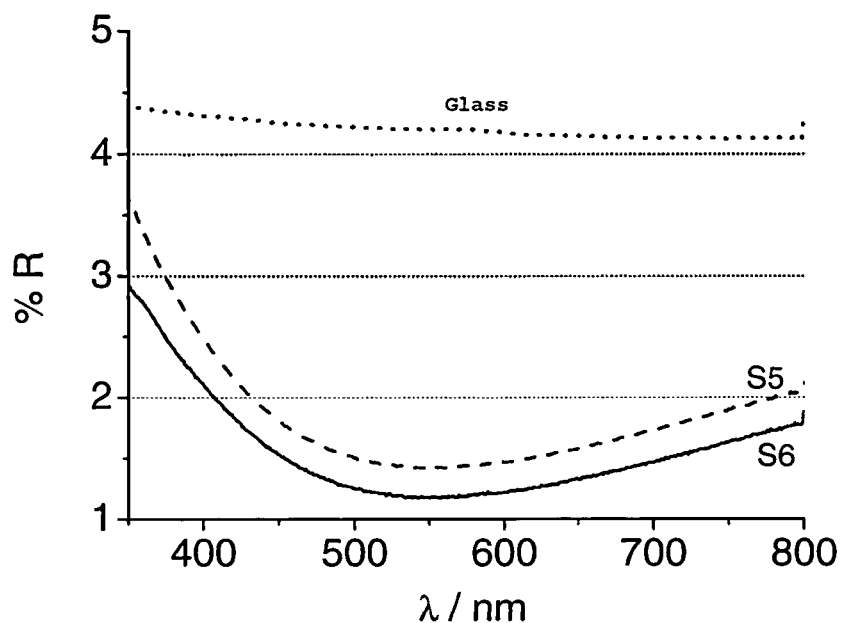
Figures 7, 12:
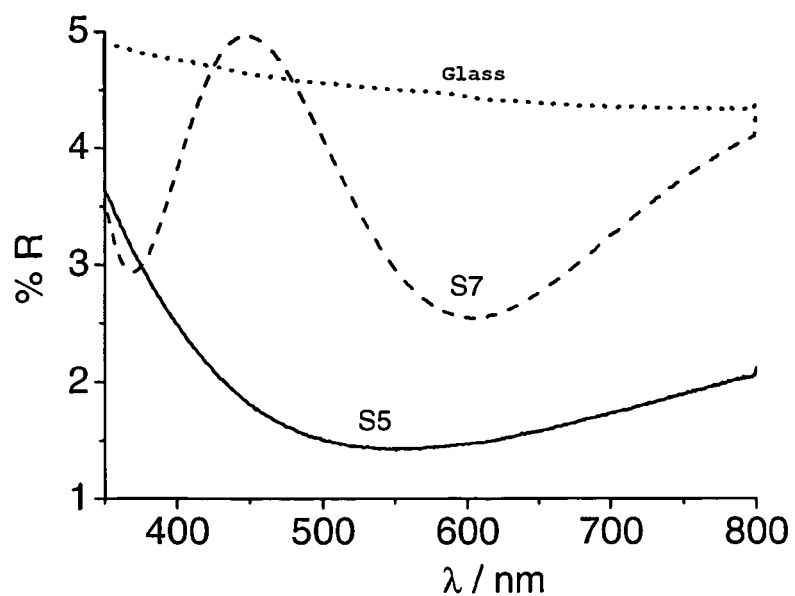
Figures 8, 12:
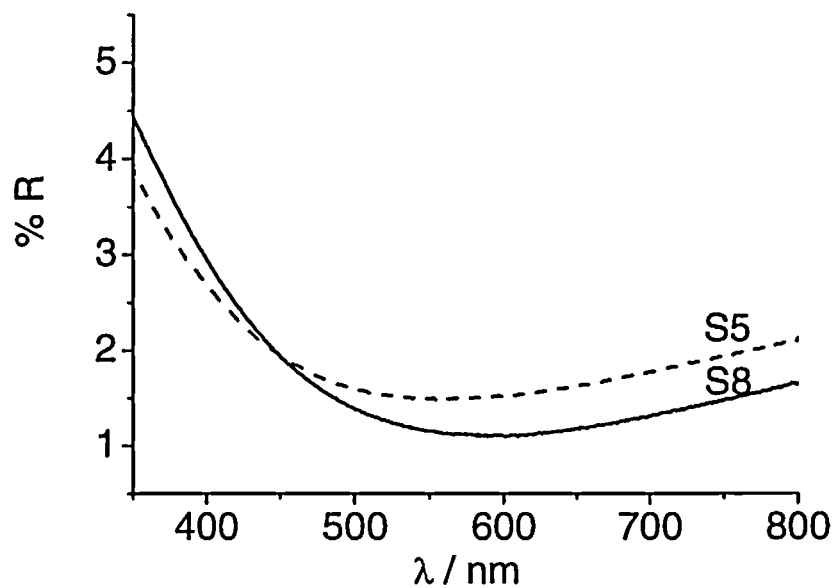
Figures 9, 12:
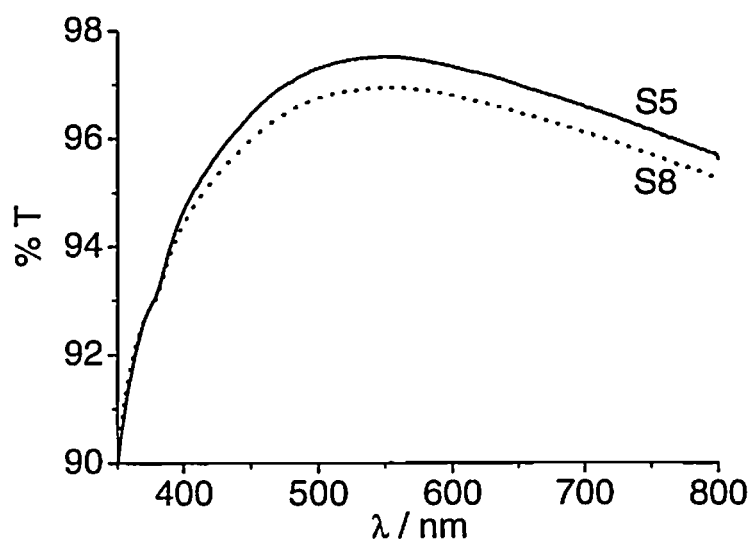
Figures 10, 12:
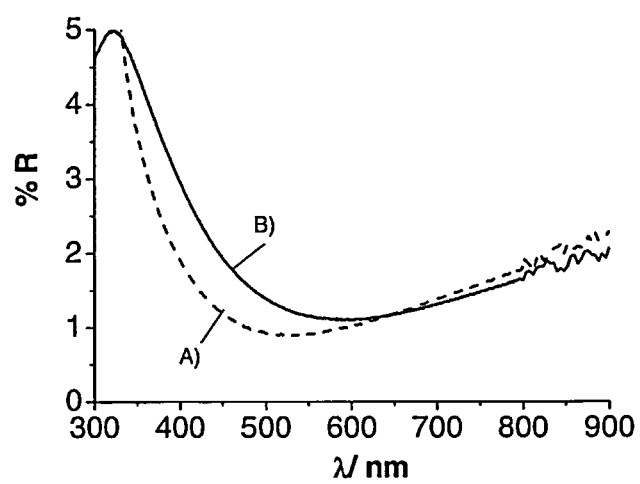

FIG. 12-1 shows the reflection spectra of coatings with composition S5 on glass with different thermal treatment. It is found that very good properties are obtained even in the case of treatment at low temperature. The same also applies to the transmission properties (FIG. 12-2). In that case too, a clearly comparable transmission is achieved even at low temperatures.

The same also applies to coating on polymers such as polycarbonate (FIG. 12-3), where an average reflection of only 1.68% is achieved for the range of 400-780 nm. On PET too, such a coating exhibits very good properties (FIG. 12-4).

This composition is quite insensitive to slight alteration of its constituents. For instance, coating S5 was modified as follows, and the respective reflection spectra were measured (FIG. 12-5):

|  |  | Reflection spectrum Average 380-780 nm |
|---|---|---|
| S5A | 5% more $SiO_2$ than S5 | 1.54 |
| S5B | 5% less $SiO_2$ than S5 | 1.54 |
| S5C | 5% more ethanol than S5 | 1.54 |
| S5D | 5% less ethanol than S5 | 1.72 |
| S5E | 5% more 2-propanol than S5 | 1.79 |
| S5F | 5% less 2-propanol than S5 | 1.49 |
| S5G | 5% more $TiO_2$ than S5 | 1.48 |
| S5H | 5% less $TiO_2$ than S5 | 1.46 |
| S5 | — | 1.58 |

Only the decrease in ethanol or an increase in the content of 2-propanol led to slightly poorer properties.

Figures 1, 6:
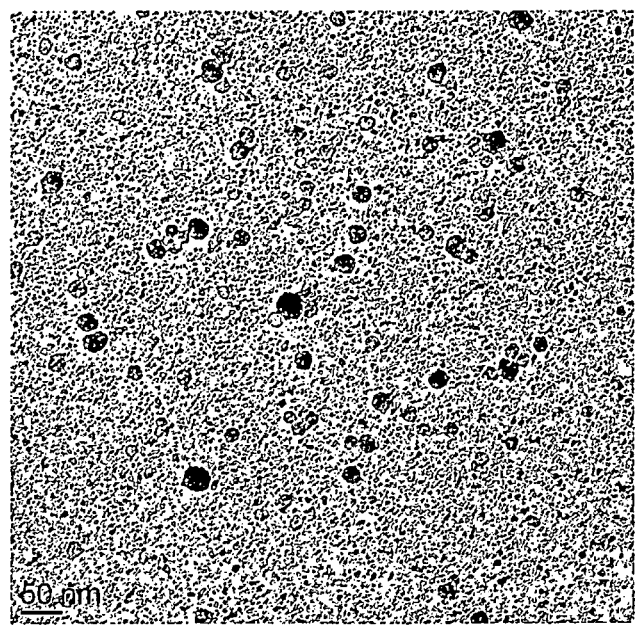
Figures 2, 6:
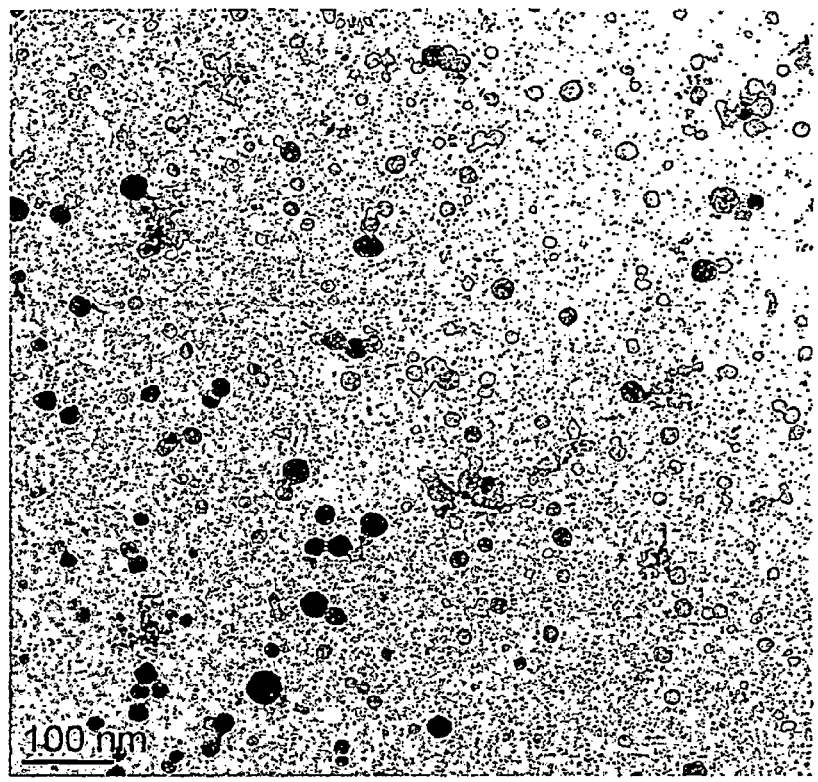
Figures 3, 6:
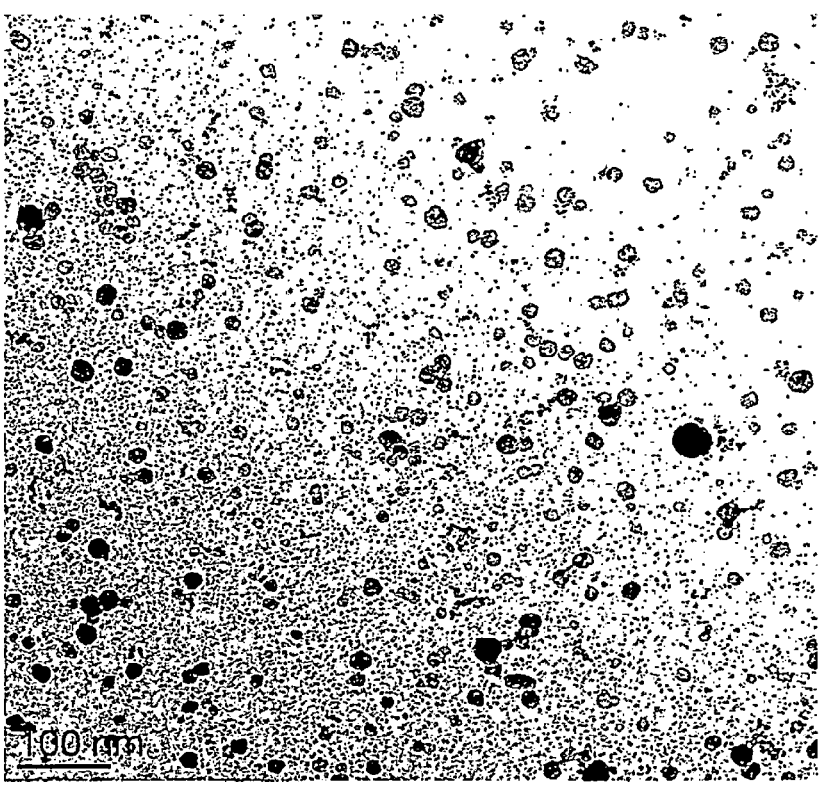

In addition, the influence of the size difference of the nanoparticles was studied. For instance, composition S6 was produced with $SiO_2$ nanoparticles of twice the size. FIG. 12-6 shows the reflection spectra on glass. Again, a slight improvement in the properties is found. The larger $SiO_2$ particles probably lead to the formation of larger cavities and nanopores.

The influence of the stabilization of the $SiO_2$ particles was studied in composition S7. This composition was produced analogously to composition S6, but with ammonia-stabilized $SiO_2$ nanoparticles. The reflection spectrum (FIG. 12-7) shows much poorer properties. The acid of the composition probably under-protects the formation of nanopores and cavities during the thermal treatment.

In order to study the influence of the $TiO_2$ nanoparticles, composition S8 was produced with lyothermally produced $TiO_2$ nanoparticles. FIG. 12-8 shows the reflection spectra measured. An average value of 1.47% (400-800 nm) was measured for S5, and an average value of 1.77% (400-800 nm) for S8. In transmission too (FIG. 12-9), the coating with composition S5 is superior to the coating with composition S8.

Figures 1, 10:
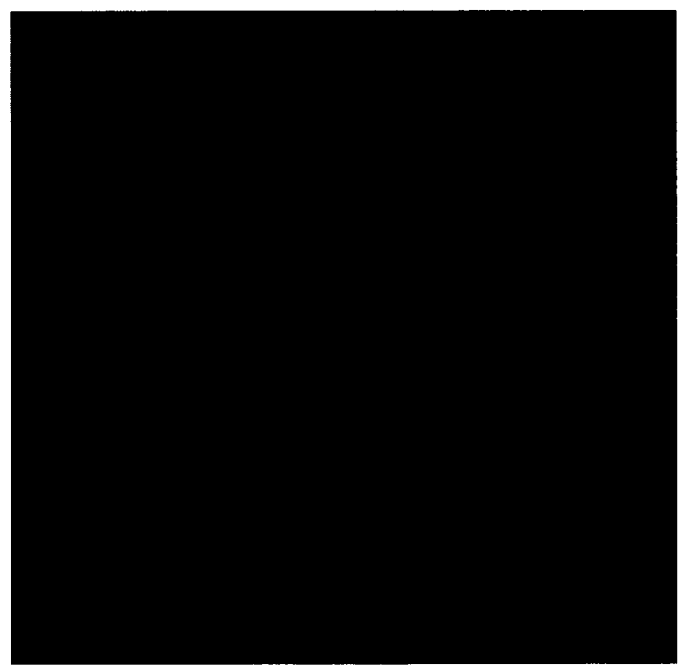
Figures 2, 10:
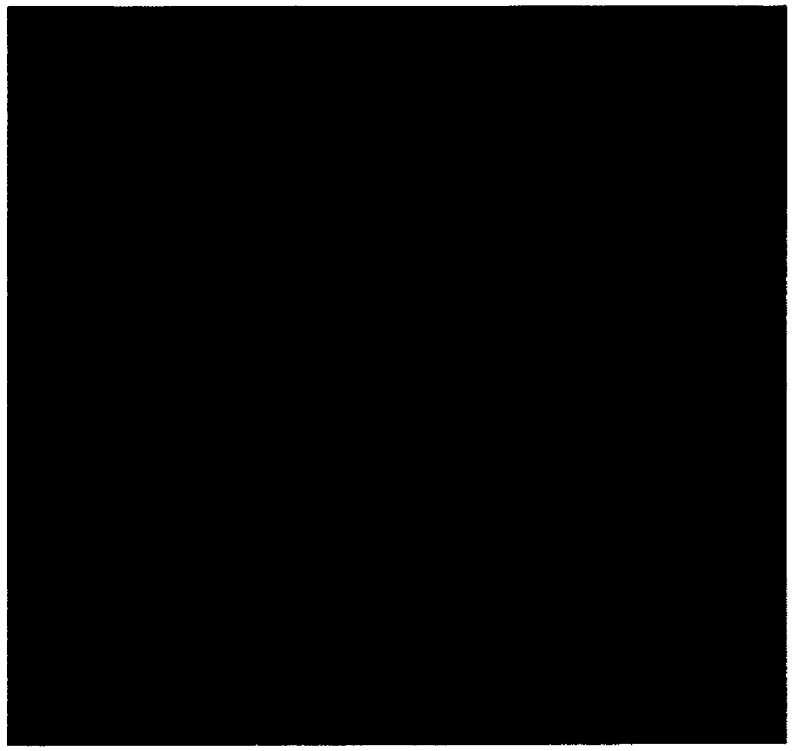
Figures 3, 10:
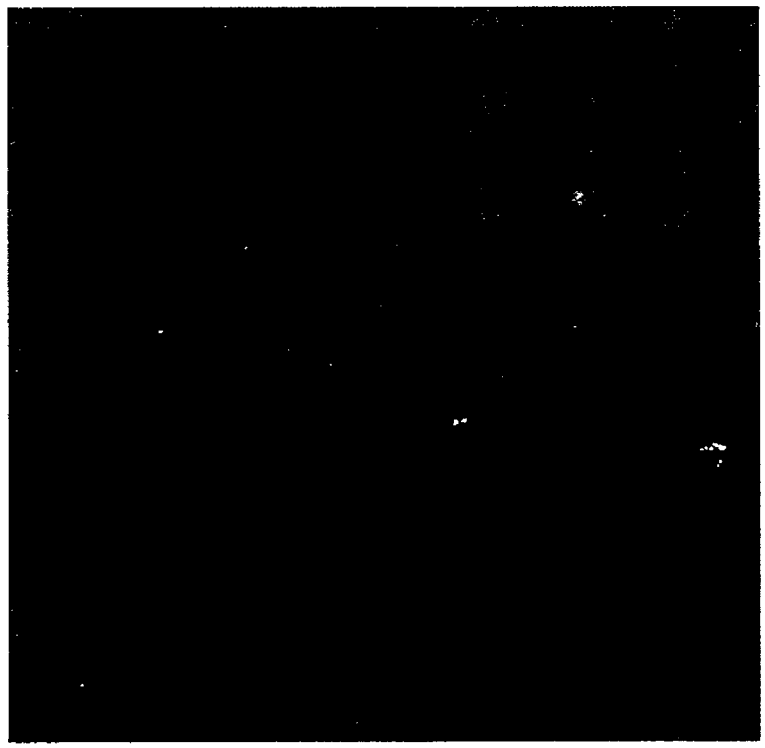
Figures 4, 10:
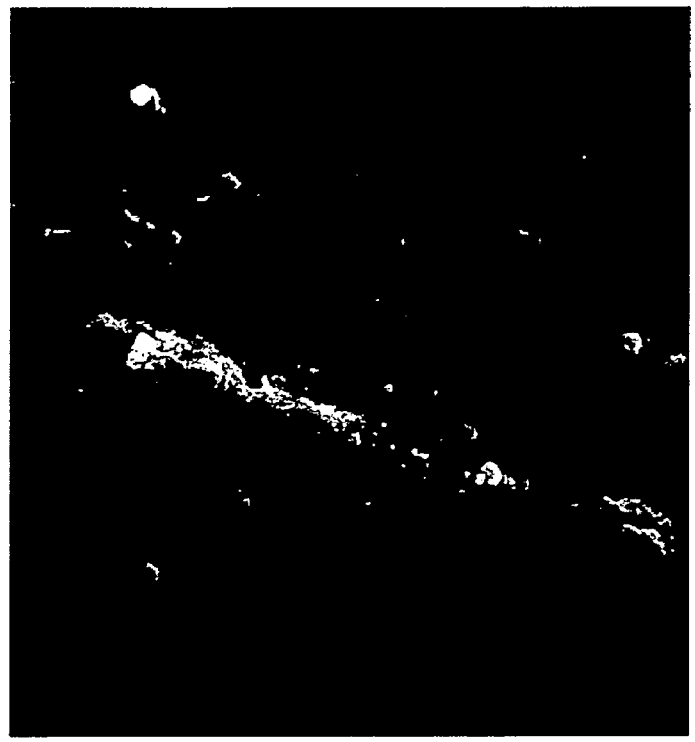
Figures 5, 10:
Figures 6, 10:
Figures 7, 10:
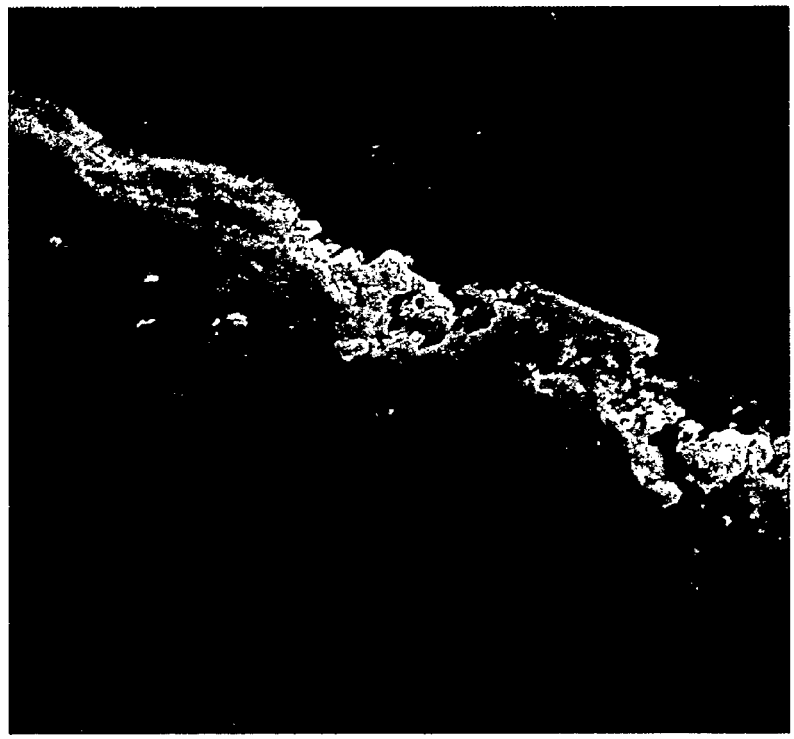
Figures 8, 10:
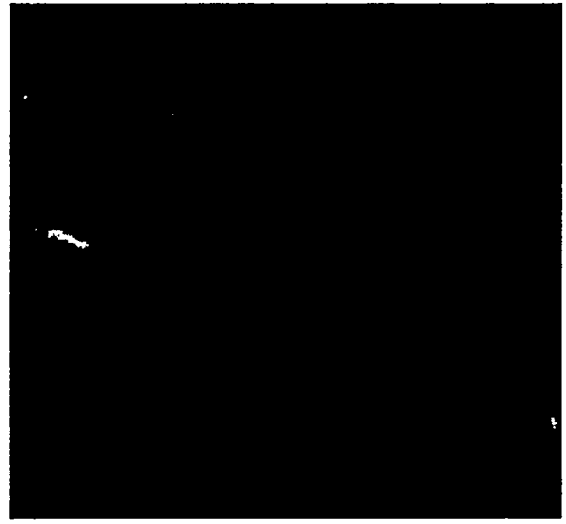
Figures 1, 11:
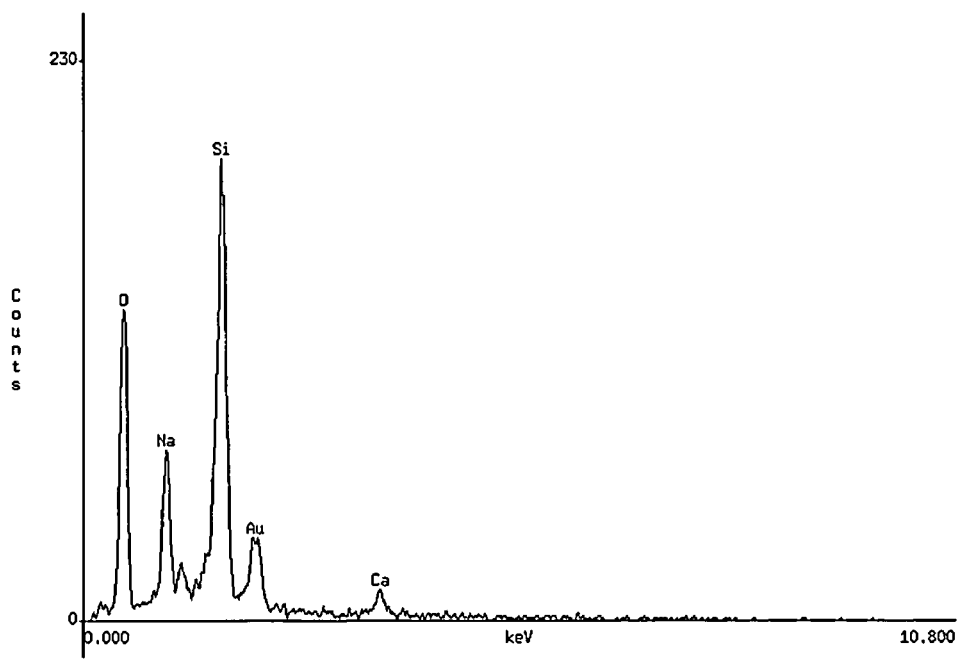
Figures 2, 11:
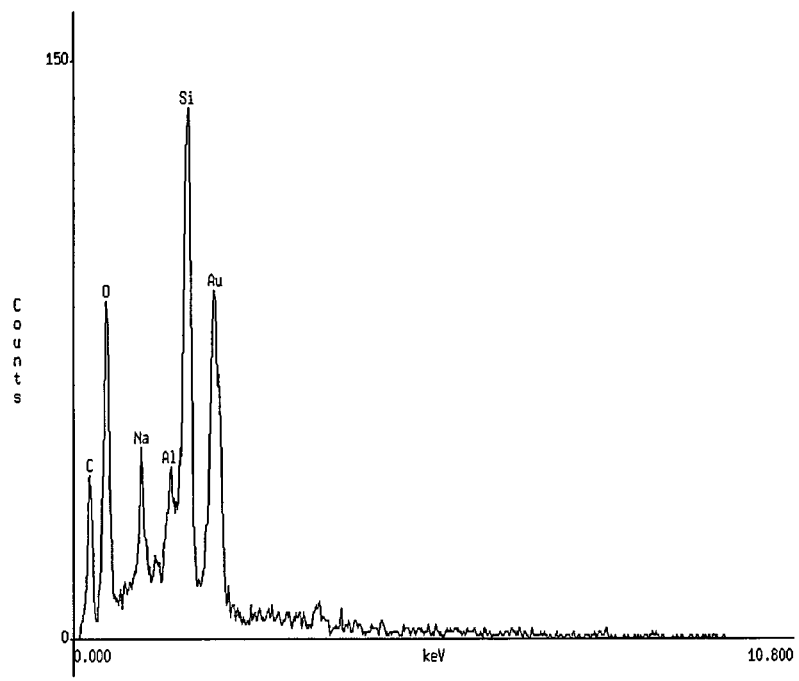

FIG. 12-10 shows reflection spectra of glass substrates coated on one side (A) and two sides (B) (S2-450° C.). It is clearly evident that the coating on one side shows a much better result. In addition, the haze of the coatings was studied, and very low values (0.06-0.1) were measured.

Figures 1, 13:
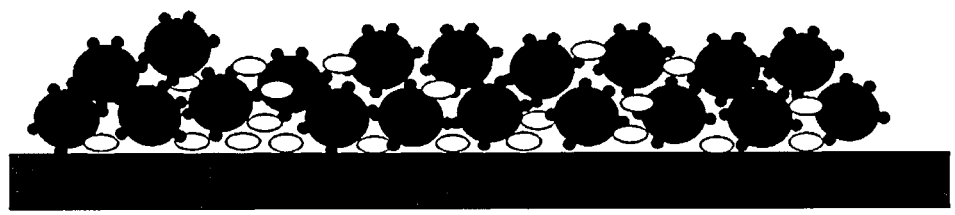
Figures 2A, 13:
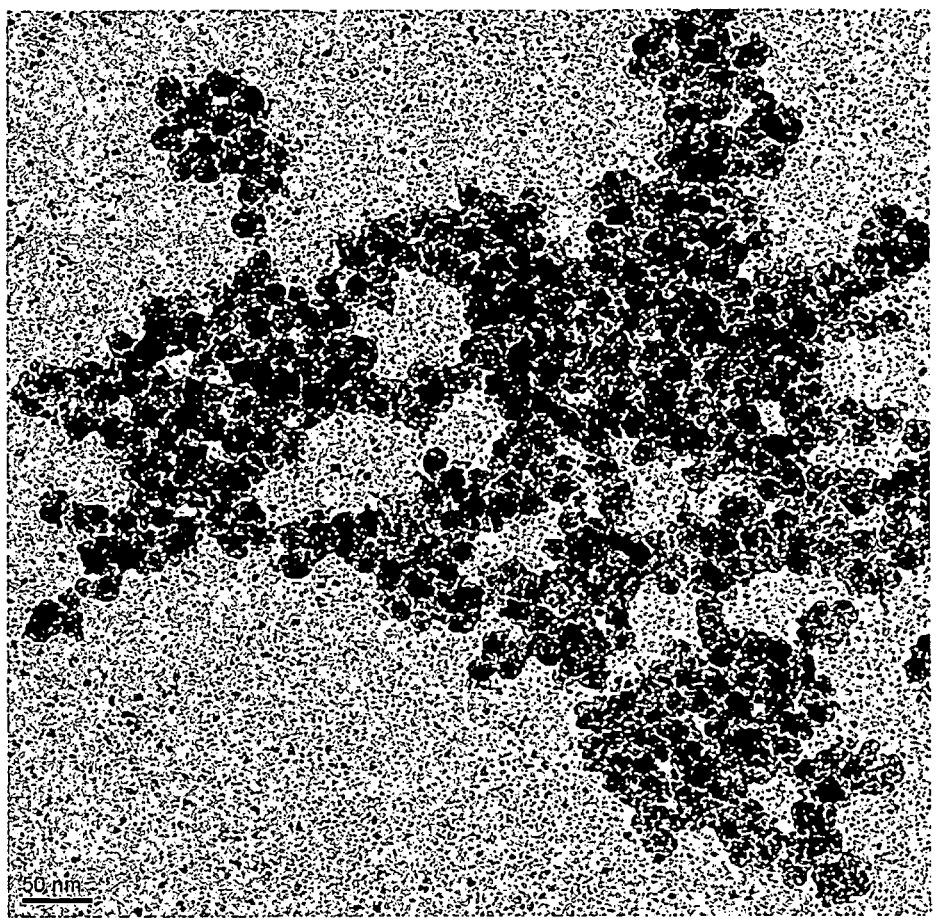
Figures 2B, 13:
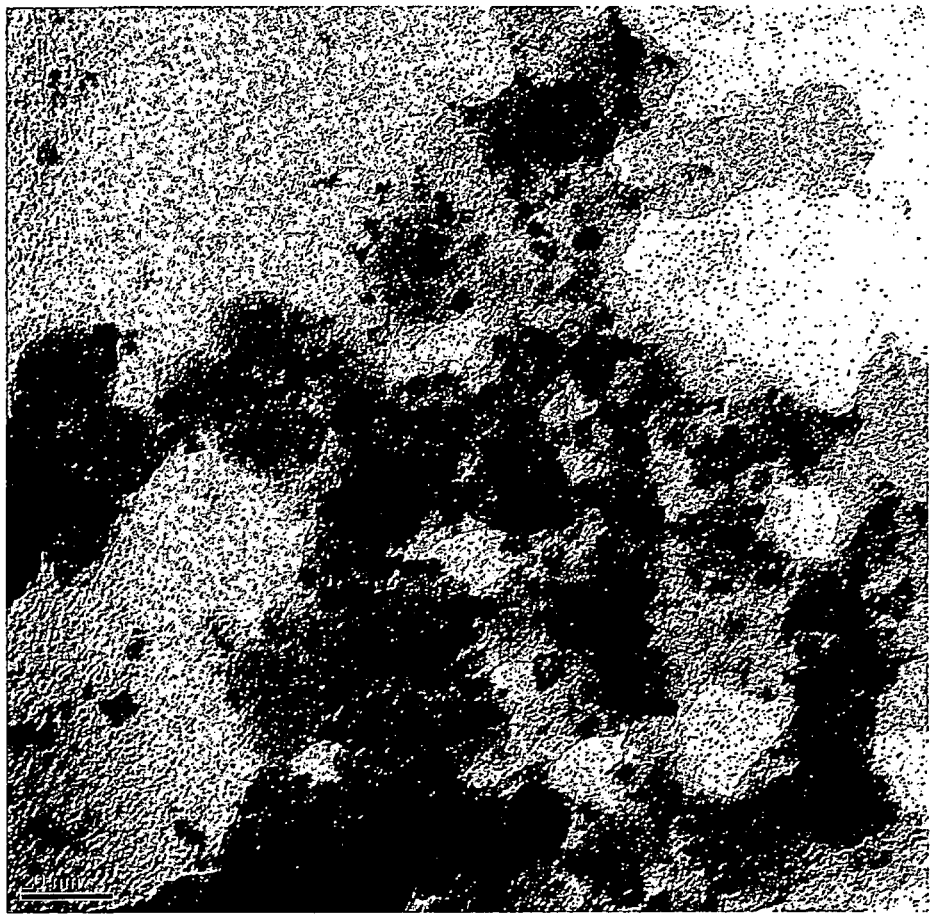
Figures 3, 13:
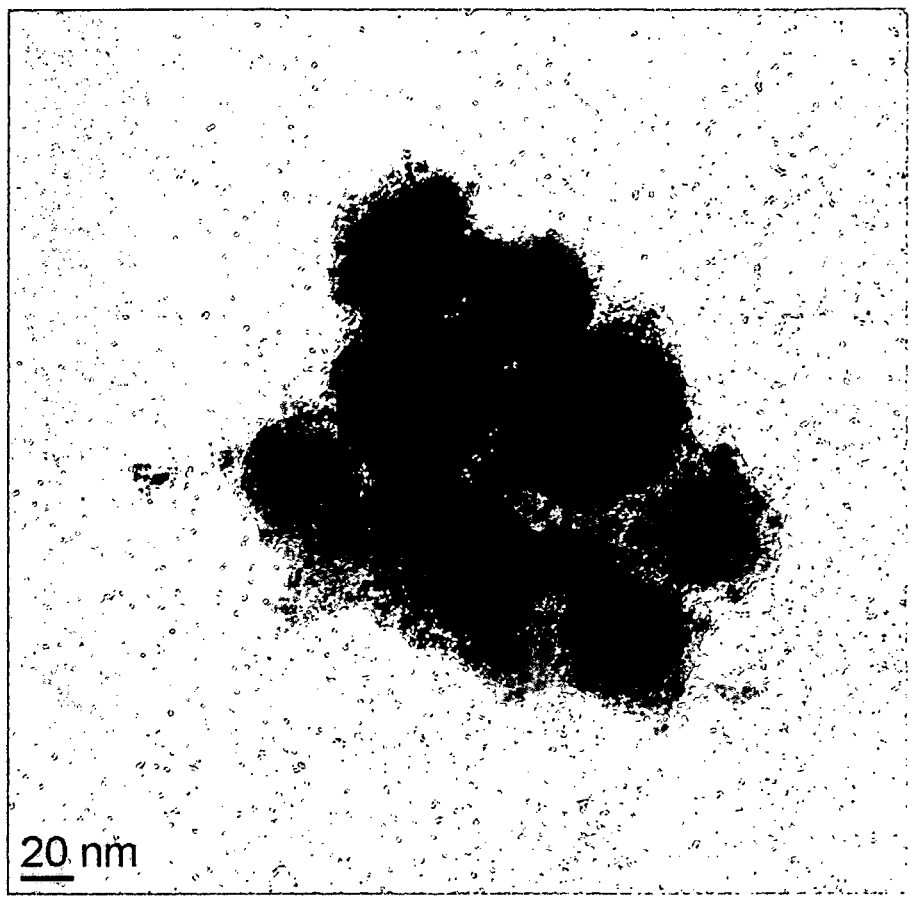

An important effect of the invention appears to lie in the interactions between the different nanoparticles in the composition. FIG. 13-1 shows a schematic diagram of a coating. The large circles show the $SiO_2$ particles covered homogeneously by the smaller $TiO_2$ particles (small circles). The elliptical elements exhibit cavities and nanopores (these are pores within the order of magnitude of nanometers, i.e. between 1 and 1000 nm, preferably between 50 and 800 nm).

This interaction is already formed in the inventive composition. For instance, FIGS. 13-2a,b and 13-3 show TEM images of a composition. These clearly show the large $SiO_2$ particles with a diameter of approx. 30 nm, which are covered homogeneously with the $TiO_2$ particles of size approx. 2-6 nm.

Production of the Compositions
Composition S1

Figures 1, 5:
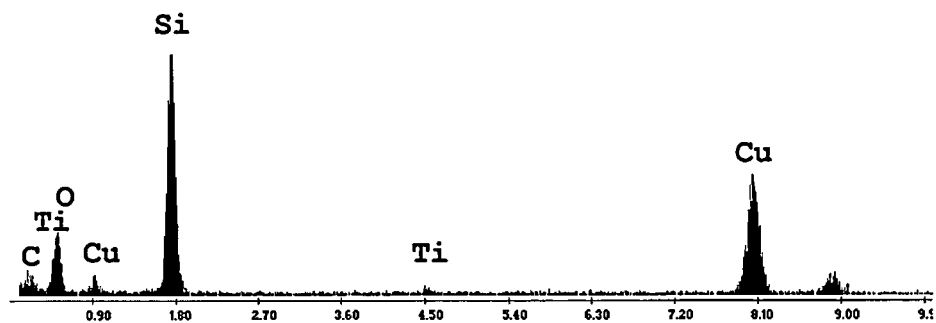

3 ml of commercially available nanoparticles (Levasil 200S 30%, 15 nm, stabilized with acetic acid) were dispersed in 24 ml of ethanol and mixed for 5 minutes. Thereafter, 3 ml of $TiO_2$ suspension (type 1; reflux method, 5 nm, 5% by weight of $TiO_2$ dispersed in 1:1 ethanol:water by volume) were added and the mixture was stirred for 2 hours. The composition has an $SiO_2$:$TiO_2$ ratio of 6:1. This was also confirmed by energy-dispersive X-ray spectroscopy (EDX) (FIG. 5-1). Analysis by transmission electron microscopy shows that the particles are present in good dispersion (FIG. 6-1).

Composition S2

Same preparation as composition S1, but with a $TiO_2$ suspension comprising type 2 $TiO_2$ particles (5 nm, see later description). Analysis by transmission electron microscopy shows that the particles are present in very good dispersion (FIG. 6-2).

Composition S3

Same preparation as composition S1, but with a $TiO_2$ suspension with type 3 $TiO_2$ particles (3-4 nm) produced by the lyothermal process. Analysis with transmission electron microscopy shows that the particles are present in very good dispersion (FIG. 6-3).

Compositions H1, H2, H3 ($TiO_2$ Sols)

For $TiO_2$ sols containing 3% by weight, 18 ml of the type 1, 2 or 3 $TiO_2$ suspension were dispersed in 12 ml of ethanol and the mixture was stirred for 2 hours. H1 consists of type 1, H2 of type 2 and H3 of type 3.

Composition L

For a 3% by weight $SiO_2$ sol, 3 ml of $SiO_2$ suspension (Levasil 200S, 30%, 15 nm, stabilized with acetic acid) were dispersed in a mixture of 24 ml of ethanol and 3 ml of water and mixed for 2 hours.

Composition S4

Figures 4A, 6:
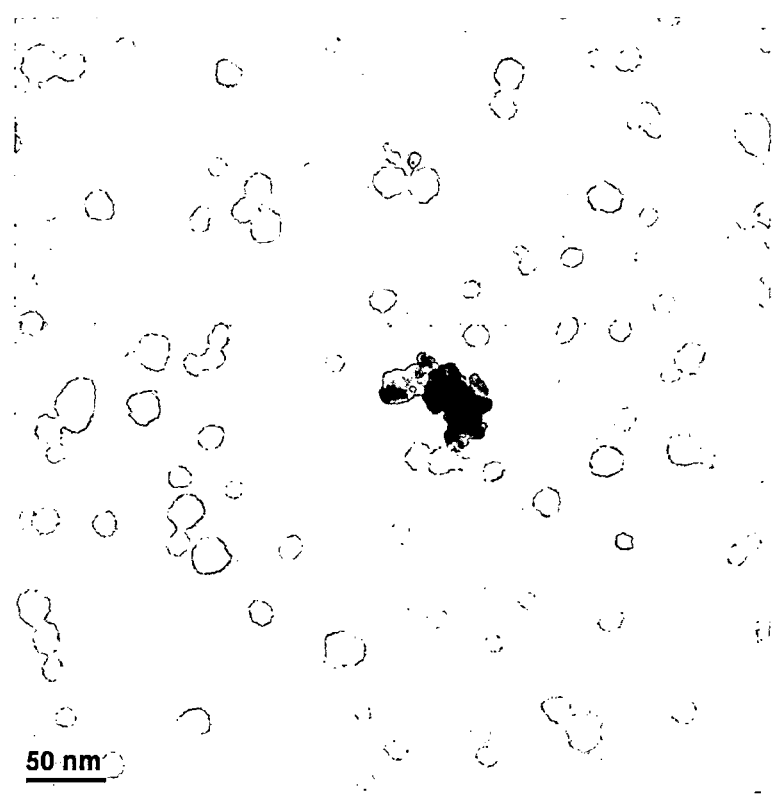
Figures 4B, 6:
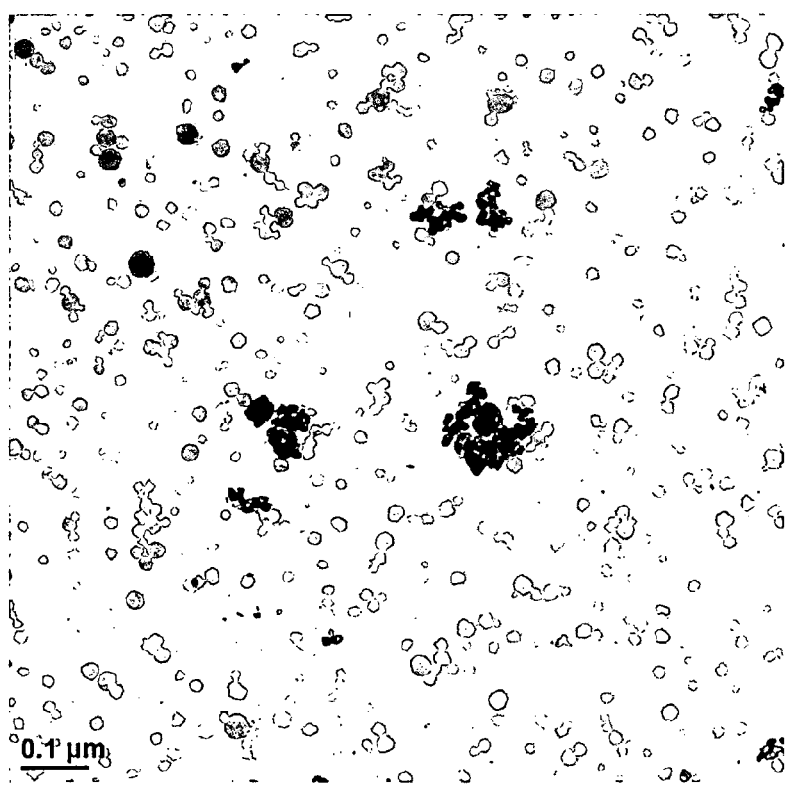

3 ml of commercially available $SiO_2$ nanoparticles (Levasil 200S, 30%, 15 nm, stabilized with acetic acid) were dispersed in 24 ml of ethanol and mixed for 5 minutes. To this were added 3 ml of a suspension of ITO nanoparticles (5% by weight dispersed in ethanol, produced from Nano-ITO c5000 SIN paste (71%)), and the mixture was stirred for 2 hours. Analysis by transmission electron microscopy shows that some of the ITO particles are present as agglomerates (FIG. 6-4a,b).

Composition ITO

For a 3% by weight ITO sol, 18 ml of a suspension of ITO nanoparticles (5% by weight dispersed in ethanol, produced from Nano-ITO c5000 SIN paste (71%)) were dispersed in 12 ml of ethanol and stirred for 2 hours.

Production of the $TiO_2$ Nanoparticles (Type 2)

72.08 g of titanium isopropoxide were added gradually to 50 ml of n-propanol and mixed for 5 minutes. Then 11.9 g of concentrated HCl (37%) were added to the mixture and mixed for 5 minutes. In the next step, 27.93 g of ethylene glycol were added gradually and mixed for 20 minutes. After thorough mixing, the mixture was transferred to a Teflon vessel and 2.36 g of water were added dropwise and stirred for a further hour. Thereafter, the mixture was heated in an autoclave at 200° C. for 3 h. The resulting $TiO_2$ particles were washed once with acetone (200 ml) and once with 1-butanal (150 ml) or 2-butanone (150 ml), and removed by centrifugation. The particles were dried at 60° C. in a vacuum oven.

Coating of the Substrates

The compositions produced were applied with a dip-coating machine at a speed of 2 mm/sec.

The following substrates were used:

glass (7.5×2.5 (l×w) thickness 1 mm)

polycarbonate (7.5×2.5 (l×w) thickness 4 mm)

PMMA (7.5×2.5 (l×w) thickness 3 mm)

After the coating, the coatings were treated in different ways.

Treatment at low temperature:

Coatings on PMMA were treated at 80° C. for one hour. Coatings on polycarbonate and glass were treated at 100° C. for one hour.

Treatment at high temperature:

The coatings on glass were treated at 450° C. at a heating rate of 5° C./min for 30 minutes.

Measurement of Transmission and Reflection

The reflection and transmission spectra were recorded with a Cary 5000 instrument.

Photocatalytic Activity

The tests were conducted with coatings composed of compositions S1, S2, S3 and H (all H sols gave similar results) on glass which had been treated at 450° C. (heating rate 5° C./min) for 30 minutes. For the photodegradation experiments, the degradation of 4-chlorophenol (4-CP) as a model substance was studied. 50 ml of a solution with a concentration of 4-CP of $c_0$=50 µmol/l were added to the respective coated glass plate and irradiated with synthetic sunlight using an Atlas Suntester CPS+ with a 750 W xenon lamp. The respective concentration $c_t$ of the 4-CPS was determined by UV-Vis spectroscopy. In FIG. 7-1, the concentrations of 4-CP normalized to the respective starting concentration $c_0$ are plotted against the irradiation time.

Measurement of Porosity

The porosity of the coatings was studied with the aid of ellipsometry. The coatings on glass were treated at 450° C., those on PMMA and PET at 80° C., and PC at 100° C. The following refractive indices were determined:

| Coating of composition: | Glass | PC | PMMA | PET |
|---|---|---|---|---|
| L - $SiO_2$ | 1.4001 | 1.5 | 1.3878 | |
| H - $TiO_2$ - 1 | 1.8009 | 1.8102 | 1.835 | |
| S1 | 1.4436 | 1.341 | 1.4045 | |
| H - $TiO_2$ - 2 | 1.9028 | 1.8885 | 1.8833 | |
| S2 | 1.3747 | 1.3408 | 1.2511 | 1.403 |
| H - $TiO_2$ - 3 | 2.0488 | 2.0472 | 2.0241 | |
| S3 | 1.4287 | 1.3866 | 1.3524 | |

The refractive index of all coatings S1, S2 and S3 comprising $SiO_2$ and $TiO_2$ is less than the refractive index of coatings L ($SiO_2$ 1.4-1.5) and H ($TiO_2$, anatase, 2.0-2.7). This indicates that these coatings have a higher porosity, for example as a result of the formation of nanopores. S2 exhibits a particularly low refractive index.

Measurement of the Contact Angle of the Coatings

In addition to the refractive index, the contact angle of a surface also permits conclusions about the porosity of a surface. A low contact angle indicates a high roughness of the surface and hence also a high porosity. The measurement was conducted under a microscope at room temperature. The contact angle with respect to water was determined at three positions on the coating and the average was formed.

| Material | Composition of the coating (low-temperature treatment) | | | | | | |
|---|---|---|---|---|---|---|---|
| PC | L | H-1 | H-2 | H-3 | S1 | S2 | S3 |
| ⊖ [°] PMMA | 69 | 51 | 62 | 64 | 50 | 45 | 50 |
| ⊖ [°] Glass | 43 | 82 | 64 | 67 | 52 | 30 | 35 |
| ⊖ [°] | 50 | 70 | 66 | 72 | 48 | 31 | 39 |

Coatings S1, S2, S3 likewise exhibit low contact angles, which indicates porosity of the coatings.

The contact angle of coatings on glass with high-temperature treatment (450° C., 30 min) was also studied:

| | H2 | H2 | S2 | S3 |
|---|---|---|---|---|
| Fresh sample | 0 | 0 | 0 | 0 |
| On new wetting for the | | | | |
| first time | 20 | 21 | 0 | 0 |
| second time | 32 | 30 | 0 | 0 |

Anticondensation Properties

For this purpose, coatings of compositions S1, S2, S3 (treated by high-temperature processes) were cooled to below 5° C. and exposed to an atmosphere with relative air humidity (50-55%). All coatings clearly have anticondensation characteristics (FIG. 8-1a-d).

Measurement of Stability/Hardness of the Coating

To measure the (mechanical) stability of the coating, a coating of composition S2 (thermal treatment at 450° C., 30 minutes, on glass substrate) was scratched with a pencil of hardness 5H and examined with an SEM microscope and EDX. The microscope images show a homogeneous surface. Scratching with the pencil scratched the surface only slightly. The EDX analysis of the undamaged surface shows essentially the signals of Si and O. After the scratching, there are additional signals from C and Al, but these originate from the pencil.

Production of Formulation S5

3.27 g (3 ml) of an $SiO_2$ sol (Levasil 200S, 30%, 15 nm, acid-stabilized) were dispersed in 50:50 ethanol and 2-propanol (11.85 g (15 ml)+11.70 g (15 ml)) and mixed for 5 minutes. Thereafter, 1.8 ml of a suspension of $TiO_2$ nanoparticles (5% by weight (90 mg) dispersed in a mixture of 1 g of water and 0.78 g of ethanol) were added and the composition was stirred for 2 hours.

Production of Formulation S5A 3.4335 g of an $SiO_2$ sol (Levasil 200S, 30%, 15 nm, acid-stabilized) were dispersed in 50:50 ethanol and 2-propanol (11.85 g (15 ml)+11.70 g (15 ml)) and mixed for 5 minutes. Thereafter, 1.8 ml of a suspension of $TiO_2$ nanoparticles (5% by weight (90 mg) dispersed in a mixture of 1 g of water and 0.78 g of ethanol) were added and the composition was stirred for 2 hours.

Production of Formulation S5B 3.1065 g of an $SiO_2$ sol (Levasil 200S, 30%, 15 nm, acid-stabilized) were dispersed in 50:50 ethanol and 2-propanol (11.85 g (15 ml)+11.70 g (15 ml)) and mixed for 5 minutes. Thereafter, 1.8 ml of a suspension of $TiO_2$ nanoparticles (5% by weight (90 mg) dispersed in a mixture of 1 g of water and 0.78 g of ethanol) were added and the composition was stirred for 2 hours.

Production of Formulation S5C 3.27 g of an $SiO_2$ sol (Levasil 200S, 30%, 15 nm, acid-stabilized) were dispersed in a mixture of ethanol (12.433 g)

and 2-propanol (11.70 g) and mixed for 5 minutes. Thereafter, 1.8 ml of a suspension of $TiO_2$ nanoparticles (5% by weight (90 mg) dispersed in a mixture of 1 g of water and 0.78 g of ethanol) were added and the composition was stirred for 2 hours.

Production of Formulation S5D 3.27 g of an $SiO_2$ sol (Levasil 200S, 30%, 15 nm, acid-stabilized) were dispersed in a mixture of ethanol (11.258 g) and 2-propanol (11.70 g) and mixed for 5 minutes. Thereafter, 1.8 ml of a suspension of $TiO_2$ nanoparticles (5% by weight (90 mg) dispersed in a mixture of 1 g of water and 0.78 g of ethanol) were added and the composition was stirred for 2 hours.

Production of Formulation S5E 3.27 g of an $SiO_2$ sol (Levasil 200S, 30%, 15 nm, acid-stabilized) were dispersed in a mixture of ethanol (11.85 g) and 2-propanol (12.285 g) and mixed for 5 minutes. Thereafter, 1.8 ml of a suspension of $TiO_2$ nanoparticles (5% by weight (90 mg) dispersed in a mixture of 1 g of water and 0.78 g of ethanol) were added and the composition was stirred for 2 hours.

Production of Formulation S5F 3.27 g of an $SiO_2$ sol (Levasil 200S, 30%, 15 nm, acid-stabilized) were dispersed in a mixture of ethanol (11.85 g) and 2-propanol (11.12 g) and mixed for 5 minutes. Thereafter, 1.8 ml of a suspension of $TiO_2$ nanoparticles (5% by weight (90 mg) dispersed in a mixture of 1 g of water and 0.78 g of ethanol) were added and the composition was stirred for 2 hours.

Production of Formulation S5G 3.27 g of an $SiO_2$ sol (Levasil 200S, 30%, 15 nm, acid-stabilized) were dispersed in a mixture of ethanol (11.85 g) and 2-propanol (11.7 g) and mixed for 5 minutes. Thereafter, 1.8 ml of a suspension of $TiO_2$ nanoparticles (5.25% by weight (94.5 mg) dispersed in a mixture of 1 g of water and 0.78 g of ethanol) were added and the composition was stirred for 2 hours.

Production of Formulation S5H 3.27 g of an $SiO_2$ sol (Levasil 200S, 30%, 15 nm, acid-stabilized) were dispersed in a mixture of ethanol (11.85 g) and 2-propanol (11.7 g) and mixed for 5 minutes. Thereafter, 1.8 ml of a suspension of $TiO_2$ nanoparticles (4.75% by weight (85.5 mg) dispersed in a mixture of 1 g of water and 0.78 g of ethanol) were added and the composition was stirred for 2 hours.

Production of Coatings Comprising Compositions S5A-S5H

The compositions were applied by dip-coating at a speed of 1.7-1.8 mm/s. The thermal treatment was performed at 550° C. for 30 minutes (heating rate 5° C./min.).

Production of Composition S6

2.65 g (2 ml) of an $SiO_2$ sol (Levasil 100S, 45%, 30 nm, acid-stabilized) were dispersed in a mixture of 50:50 ethanol (14.22 g) and 2-propanol (14.04 g) and mixed for 5 minutes. Thereafter, 1.8 ml of a suspension of $TiO_2$ nanoparticles (5% by weight (90 mg) dispersed in a mixture of 1 g of water and 0.78 g of ethanol) were added and the composition was stirred for 2 hours.

Production of Composition S7

The composition was produced analogously to composition S6, except using base-stabilized (ammonia) $SiO_2$ sol.

Production of Composition S8

The composition was produced analogously to composition S5, except using lyothermally produced $TiO_2$ nanoparticles (type 2).

Numerous modifications and developments of the working examples described can be implemented.

List of literature cited:
US 2008/0268229 A1

The invention claimed is:

1. A process for producing coatings with anti-reflection properties, comprising the following steps:
   a) producing a composition from at least two kinds of nanoparticles that differ in at least one property selected from the group consisting of size, composition, and internal structure and at least one solvent;
   b) applying the composition to a substrate; and
   c) thermally treating the coated substrate,
   wherein at least one kind of nanoparticles comprises nanoparticles stabilized by a carboxylic acid,
   wherein the composition comprises at least $SiO_2$ nanoparticles and $TiO_2$ or ITO nanoparticles.

2. The process as claimed in claim 1, wherein the thermal treatment is performed at below 200° C.

3. The process as claimed in claim 1, wherein the thermal treatment is performed at above 400° C.

4. The process as claimed in claim 1, wherein step b) is performed only once in the course of performance of the process.

5. The process as claimed claim 1, wherein the composition has a total content of nanoparticles of more than 1% by weight.

6. The process as claimed in claim 1, wherein the two kinds of nanoparticles differ in their mean particle size at least by a factor of 2.

7. The process as claimed in claim 1, wherein the at least one solvent is selected from the group comprising $C_1$-$C_8$-alcohols, $C_1$-$C_8$-ketones, $C_1$-$C_8$-aldehydes, and water.

8. The process as claimed in claim 1, wherein the composition comprises at least 2 solvents.

9. The process as claimed in claim 1, wherein the composition does not comprise any further additives.

10. The process as claimed in claim 1, wherein the composition does not comprise wetting agents and/or polymers.

11. The process as claimed in claim 1, wherein the composition comprises the at least two kinds of nanoparticles dispersed in the at least one solvent.

12. The process as claimed in claim 1, wherein the carboxylic acid comprises a mono- and polybasic carboxylic acid having 2-8 carbon atoms.

* * * * *